United States Patent
Itoh

(10) Patent No.: US 7,526,180 B2
(45) Date of Patent: Apr. 28, 2009

(54) IMAGE PROCESSING APPARATUS, IMAGE DATA MANAGING METHOD, AND INFORMATION RECORDING MEDIUM

(75) Inventor: Naoto Itoh, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 664 days.

(21) Appl. No.: 10/962,757

(22) Filed: Oct. 13, 2004

(65) Prior Publication Data

US 2005/0084236 A1    Apr. 21, 2005

(30) Foreign Application Priority Data

Oct. 20, 2003    (JP)    ............. P2003-359909
Sep. 14, 2004    (JP)    ............. P2004-267124

(51) Int. Cl.
H04N 5/76    (2006.01)
H04N 7/00    (2006.01)
H04N 5/00    (2006.01)

(52) U.S. Cl. ..................... 386/46; 386/125
(58) Field of Classification Search ............ 386/1, 386/45–46, 125–126
See application file for complete search history.

(56) References Cited

U.S. PATENT DOCUMENTS 6,636,953 B2 * 10/2003 Yuasa et al. ............. 711/161

2001/0002224 A1    5/2001    Sasaki et al.
2002/0126587 A1    9/2002    Ohtani et al.
2002/0150382 A1    10/2002    Sasaki et al.
2002/0184457 A1    12/2002    Yuasa et al.
2003/0099460 A1    5/2003    Imada et al.

FOREIGN PATENT DOCUMENTS

| EP | 0 762 756 | 3/1997 |
|---|---|---|
| EP | 1 161 087 A2 | 12/2001 |
| JP | A-2001-043168 | 2/2001 |
| JP | A-2002-344879 | 11/2002 |
| WO | WO 02/03682 A2 | 1/2002 |

* cited by examiner

Primary Examiner—Thai Tran
Assistant Examiner—Nigar Chowdhury
(74) Attorney, Agent, or Firm—Drinker Biddle & Reath LLP

(57) ABSTRACT

An image processing apparatus has a configuration in which contents-data received via a TV receiving unit is recorded in a main recording apparatus. When the proportion of use in all of storage capacity of the main recording apparatus exceeds a threshold, a system controlling unit determines reproduction priority on the basis of reproduction frequency Sx indicative of preference of a user, compresses contents-data having low reproduction priority, records the compressed contents-data into an auxiliary recording apparatus, and deletes the contents-data from the main recording apparatus. In such a manner, while making the preference of the user reflected, the contents-data in the main recording apparatus can be managed.

14 Claims, 22 Drawing Sheets

FIG. 2

| GENRE | THE NUMBER OF RECORDING CONTENTS:Xr | THE TOTAL NUMBER OF REPRODUCTION TIMES:Xp | THE NUMBER OF COMPRESSED CONTENTS:Xd | THE NUMBER OF REGRETS:Xm | REPRODUCTION FREQUENCY:Sj |
|---|---|---|---|---|---|
| MOVIE | 6 | 10 | 3 | 3 | 2.4 |
| DRAMA | 2 | 4 | 2 | 0 | 1.3 |
| ANIMATION | 5 | 10 | 1 | 1 | 2.7 |
| SPORTS | 10 | 10 | 8 | 0 | 1.2 |
| NEWS | 7 | 3 | 5 | 0 | 0.4 |
| MUSIC | 1 | 1 | 1 | 1 | 1 |

TBL1

FIG. 3

| CATEGORY | REPRODUCTION PRIORITY | ERASE STATE | RECORDING DATE AND TIME | | BROADCAST CHANNEL | TITLE | GENRE |
|---|---|---|---|---|---|---|---|
| | | | YEAR/MONTH/DAY | TIME | | | |
| UN-PRODUCED CONTENTS-DATA | 1 | | 2003/8/6 | 20:00:00-22:00:00 | 1ch | aaa | MOVIE |
| | 2 | | 2003/7/18 | 20:00:00-23:45:00 | 2ch | bbb | MOVIE |
| | 3 | | 2003/8/7 | 10:00:00-10:30:00 | 3ch | ccc | DRAMA |
| | 4 | | 2003/7/22 | 21:00:00-21:54:00 | 4ch | ddd | DRAMA |
| | 5 | | 2003/7/25 | 06:00:00-09:00:00 | 5ch | eee | SPORTS |
| | 6 | | 2003/8/1 | 18:30:00-18:30:00 | 6ch | fff | NEWS |
| REPRODUCED CONTENTS-DATA | 7 | | 2003/7/7 | 14:00:00-15:40:00 | 7ch | ggg | LITERATURE |
| | 8 | | 2003/7/29 | 20:00:00-21:00:00 | 8ch | hhh | DRAMA |
| | | TEMPORARY ERASE | 2003/7/1 | 23:00:00-23:30:00 | 9ch | iii | MUSIC |
| ERASED CONTENTS-DATA | | COMPLETE ERASE | 2003/7/11 | 01:00:00-01:20:00 | 10ch | jjj | SHOPPING |

TBL2

FIG. 4

| RECORDING RESERVED DATE AND TIME ||ch|
|---|---|---|
| RECORDING START TIME | RECORDING END TIME | |
| 2003/12/15 20:00 | 2003/12/15 22:00 | 3ch |
| 2003/12/17 21:00 | 2003/12/17 23:30 | 5ch |
| ... | ... | ... |

TBL3

FIG.14

| | | | |
|---|---|---|---|
| UN-PRODUCED CONTENTS-DATA | aaa | MOVIE | 2003/8/6/20:00~ 22:00 |
| | bbb | MOVIE | 2003/7/18/20:00~ 23:45 |
| | ccc | DRAMA | 2003/8/7/10:00~ 10:30 |
| REPRODUCED CONTENTS-DATA | fff | NEWS | 2003/8/1/18:00~ 18:30 |
| | ggg | LITERATURE | 2003/7/7/14:00~ 15:40 |
| ERASED CONTENTS-DATA | iii | MUSIC | 2003/7/1/23:00~ 23:30 |

IMAGE PROCESSING APPARATUS, IMAGE DATA MANAGING METHOD, AND INFORMATION RECORDING MEDIUM

BACKGROUND OF THE INVENTION

1. Field of the Invention

The present invention relates to management of image contents and, more particularly, to a technical field of digital motion pictures.

2. Description of the Related Art

In recent years, image processing apparatuses such as an HD (Hard Disc) recorder and a PC (Personal Computer) having the function of recording image contents-data provided via a communication infrastructure such as the Internet and a broadcast infrastructure, and reproducing the image contents-data in accordance with intention of a user are being spread.

Image processing apparatuses having the function of automatically erasing recorded contents-data in order to effectively use recording capacity of a built-in recording medium have been proposed (refer to, for example, Japanese Patent Application Laid-open Nos. 2001-43168 (page 4, FIG. 1) and 2002-344879 (page 4, FIG. 2)).

The conventional image processing apparatuses, however, employ a configuration of automatically erasing contents-data from the oldest recording date/time or reproduction date and time irrespective of the intention of the user. Consequently, in the image processing apparatuses, there is the possibility that contents-data to be erased is uniformly erased irrespective of importance of the contents-data to the user, so that it is very disadvantageous and inconvenient.

SUMMARY OF THE INVENTION

The invention has been achieved in consideration of the circumstances, and an example of object of the invention is to provide an image processing apparatus, an image data managing method, and an information recording medium capable of effectively utilizing a storage medium, while making the preference of the user reflected.

To solve the above problem, the invention according to claim 1 relates to an image processing apparatus comprising:

a recording device which records a plurality of pieces of contents-data including at least image data;

a decoding device which reads said contents-data, decodes the read contents-data, and outputs an image signal corresponding to the read contents-data;

a calculating device which calculates preference information indicative of reproduction desire of a user for said contents-data on the basis of state information indicative of at least one a recording state or a reproduction state of said plurality of pieces of contents-data;

a selecting device which, when a recording amount of said recording device exceeds a predetermined value, selects at least one piece of said plurality of pieces of contents-data recorded in said recording device on the basis of said preference information; and an erasing device which erases said contents-data selected by said selecting device from said recording device.

The invention according to claim 13 relates to an image data managing method comprising:

a calculating process which calculates preference information indicative of reproduction desire of a user for said contents-data on the basis of state information indicative of at least one a recording state or a reproduction state corresponding to a plurality of pieces of contents-data including at least image data recorded in a recording device;

a selecting process which, when a recording amount of said recording device exceeds a predetermined value, selects at least one piece of said plurality of pieces of contents-data recorded in said recording device on the basis of said preference information; and an erasing process which erases said contents-data selected in said selecting process from said recording device.

The invention according to claim 14 relates to a computer-readable information recording medium on which an image data managing program is recorded, Wherein said image data managing program manages image data by a computer, and makes said computer function as:

a calculating device which calculates preference information indicative of reproduction desire of a user for said contents-data on the basis of state information indicative of at least one a recording state or a reproduction state corresponding to a plurality of pieces of contents-data including at least image data recorded in a recording device;

a selecting device which, when a recording amount of said recording device exceeds a predetermined value, selects at least one piece of said plurality of pieces of contents-data recorded in said recording device on the basis of said preference information; and an erasing device which erases said contents-data selected by said selecting device from said recording device.

BRIEF DESCRIPTION OF THE DRAWINGS

FIG. 2 is a diagram showing the contents of a genre management table TBL1 in the first embodiment;

FIG. 3 is a diagram showing the contents of a contents management table TBL2 in the first embodiment;

FIG. 4 is a diagram showing the contents of a recording reservation table TBL3 in the first embodiment;

FIG. 14 is a diagram showing a display example of a check screen displayed on a monitor 2 in the first embodiment;

DESCRIPTION OF PREFERRED EMBODIMENTS OF THE INVENTION

Embodiments of the invention will now be described herein below with reference to the drawings. The invention is not limited to the embodiment, but can be arbitrarily changed within the scope of technical idea of the invention.

1 First Embodiment

1.1 Configuration of First Embodiment

Figure 1:
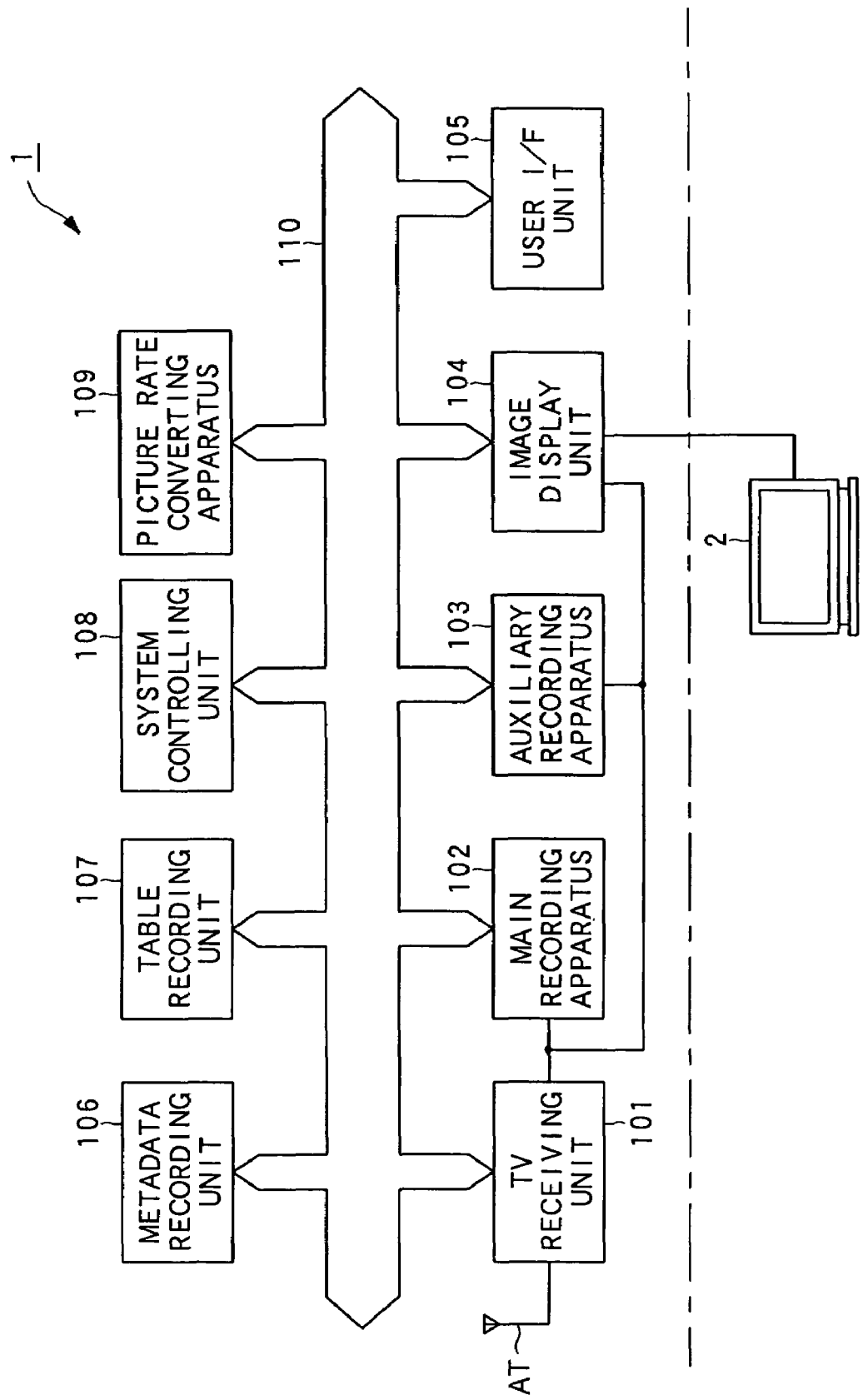
FIG. 1 is a block diagram showing the configuration of an image processing apparatus 1 in a first embodiment.

First, the configuration of an image processing apparatus according to a first embodiment will be described with reference to FIG. 1. FIG. 1 is a block diagram showing the configuration of an image processing apparatus 1 according to the embodiment.

As shown in the diagram, the image processing apparatus 1 according to the embodiment has a TV receiving unit 101, a main recording apparatus 102, an auxiliary recording apparatus 103, an image display unit 104, a user interface unit 105 (hereinbelow, the interface will be abbreviated as "I/F"), a metadata recording unit 106, a table recording unit 107, a system controlling unit 108, a picture rate converting apparatus 109, and a data bus 110 which connects those components.

For example, the TV receiving unit 101 of the embodiment corresponds to a "communication unit" of the invention, the main recording apparatus 102 corresponds to a "recording device", and the auxiliary recording apparatus 103 corresponds to an "auxiliary recording device". For example, the image display unit 104 of the embodiment corresponds to a "decoding device" of the invention, the system controlling unit 108 corresponds to a "calculating device" and a "selecting device" of the invention, and the picture rate converting apparatus 109 corresponds to a "writing device", a "re-encoding device", a "generating device", and a "data writing device" of the invention.

The image processing apparatus 1 of the embodiment is an apparatus which receives terrestrial digital broadcasting waves, and records and reproduces data corresponding to contents (hereinbelow, called "contents-data") included in the broadcasting waves. When the remaining quantity of the storage capacity of the main recording apparatus 102 on which data is to be recorded becomes below a predetermined value, at least one piece of contents-data recorded in the main recording apparatus 102 is compressed, and re-recorded into the auxiliary recording apparatus 103, thereby effectively utilizing the storage capacity of a recording medium built in the image processing apparatus 1. The elements of the apparatus will be described hereinbelow.

The TV receiving unit 101 is a receiver for terrestrial digital broadcasting, tunes to a frequency selected by a user, performs a demodulating process on broadcast waves received via a reception antenna AT, and supplies the demodulated broadcast data to the system controlling unit 108.

The user I/F unit 105 has an operator such as a not-shown keyboard or an external remote controller, and outputs an input signal corresponding to an input operation of the user to the system controlling unit 108.

The main recording apparatus 102 is a recording medium constructed by, for example, a hard disc. In the terrestrial digital broadcasting, a data stream generated by broadcast data includes contents-data constructed by motion picture data and sound data encoded in the MPEG form, metadata indicative of the attribute of the contents-data, and the like. In the main recording apparatus 102 according to the embodiment, only contents-data in the broadcast data is recorded.

On the other hand, the auxiliary recording apparatus 103 is a recording medium provided to assist the main recording apparatus 102. The main recording apparatus 102 and the auxiliary recording apparatus 103 may be realized by dividing one hard disc into two areas, or by being constructed by two hard discs, in light of hardware.

The picture rate converting apparatus 109, under control of the system controlling unit 108, reads contents-data from the main recording apparatus 102, generates compressed contents-data by compressing the data amount of the contents-data, and writes the compressed contents-data in the auxiliary recording apparatus 103. At this time, the picture rate converting apparatus 109 erases the contents-data from the main recording apparatus 102. Consequently, in the image processing apparatus 1 according to the embodiment, the storage capacity of the main recording apparatus 102 is assured.

There are the following three data compressing methods in the picture rate converting apparatus 109. The picture rate converting apparatus 109 compresses contents-data by one of these methods.

i) Compressing Method 1

In this method, the picture rate converting apparatus 109 once decodes contents-data read from the main recording apparatus 102, and encodes again the data by a larger quantizing step, thereby generating compressed contents-data. The picture rate converting apparatus 109 records the generated compressed contents-data to the auxiliary recording apparatus 102.

ii) Compressing Method 2

In this method, the picture rate converting apparatus 109 generates the second contents-data by performing a frame reducing compressing process of reducing predetermined frames from a plurality of frames constructing contents-data. To be more precise, the picture rate converting apparatus 109 generates compressed contents-data by reducing or thinning out frames such as B frames having low possibility of exerting an influence at the time of decoding from a plurality of frames constructing the contents-data read from the main recording apparatus 102 at a predetermined rate. As a result, for example, contents-data of pictures of 30 frames/second is compressed to data of images of 10 frames/second of only I and P frames. The picture rate converting apparatus 109 records the compressed contents-data into the auxiliary recording apparatus 103.

iii) Compressing Method 3

In this method, the picture rate converting apparatus 109 decodes contents-data read from the main recording apparatus 102, and re-encodes the contents-data by a method of a higher compression rate such as the H.264 (ITU-T) or WMV9 (Windows Media (trademark) 9) method than that of the contents-data, thereby generating compressed contents-data. The picture rate converting apparatus 109 records the compressed contents-data in the auxiliary recording apparatus 103.

A compressing method is selected by the system controlling unit 108, and the picture rate converting apparatus 109 compresses data by the method selected by the system controlling unit 108. This will be described in detail later.

In the table recording unit 107, a genre management table TBL1 shown in FIG. 2 is stored. As shown in FIG. 2, in the genre management table TBL1, fields for storing a parameter of reproduction frequency Sj are provided in association with each of genres. In the genre management table TBL1, counters for counting the number of recording contents Xr, the total reproduction number Xp, the number of compressed contents Xd, and the number of regrets Xm which are for each genre are stored.

The number of recording contents Xr and the reproduction frequency Sj will now be described.

The number of recording contents Xr is a value indicative of the total number of contents-data belonging to the genre recorded in the main recording apparatus 102, and is updated when the number of contents-data recorded in the main recording apparatus 102 changes. The total reproduction number Xp is a value indicative of the total number of times of reproducing contents-data belonging to the genre, and is updated when the contents-data is reproduced. Further, the number of regrets Xm is a value indicative of the number of times at which the user regrets about compression/erasure of the contents-data after the contents-data is compressed/erased, and is updated when a regret number updating process to be described later is executed.

The reproduction frequency Sj is a parameter indicative of strength of desire for reproduction of the user for contents belonging to each genre, and is determined every genre. The larger the numerical value of the reproduction frequency Sj is, the higher the desire of reproduction of the user for the contents-data belonging to the genre is. The reproduction frequency Sj is calculated by substituting each of the parameters into the following Equation.

$$Sj = \log Xr + \frac{Xp - Xd + Xm}{Xr} \quad \text{Equation 1}$$

The reproduction frequency Sj is calculated by the system controlling unit 108 which will be described later.

In the table recording unit 107, a contents management table TBL2 shown in FIG. 3 is stored. As shown in FIG. 3, the contents management table TBL2 according to the embodiment has fields for storing parameters such as the title, genre, recording date and time, broadcasting channel (hereinafter, "channel" is also called "ch"), and erase state and, of each contents, which belong to a category of three kinds of categories "un-reproduced contents-data", "reproduced contents-data", and "erased contents-data" indicative of the states of contents-data, and a parameter of reproduction priority.

The state of contents-data and reproduction priority in the state will be described here.

The "erase state" is information indicative of the state of contents-data erased from the main recording apparatus 102. The information of the "erase state" includes two kinds of information: information of "temporary erase" indicative of a state where contents-data is recorded as compressed contents-data in the auxiliary recording apparatus 103; and information of "complete erase" indicative of a state where contents-data is erased also from the auxiliary recording apparatus 103. The information of "temporary erase" includes information indicative of a compressing method used for compressing the contents-data in the picture rate converting apparatus 109.

On the other hand, the parameter of reproduction priority is a parameter indicative of priority at the time of compressing contents-data recorded in the main recording apparatus 102 and re-recording the compressed data into the auxiliary recording apparatus 103, and meaning that the contents-data is compressed in order from the lowest priority. In the example shown in FIG. 3, reproduction priority of contents-data having the title name "aaa" is the highest, and is "1". Therefore, in the example shown in the diagram, the contents-data having the title name "aaa" is contents-data which is less apt to be an object of compression among all of contents-data recorded in the main recording apparatus 102.

The reproduction priority is classified according to whether each contents-data after recorded in the main recording apparatus 102 is reproduced or not. High reproduction priority is given to contents-data in the category of "un-reproduced contents-data" than contents-data in the category of "reproduced contents-data".

The reproduction priority of the contents-data belonging to each of the categories of "un-reproduced contents-data" and "reproduced contents-data" is determined on the basis of the reproduction frequency Sx corresponding to the contents-data. The reproduction frequency Sx is preference information indicative of the desire of the user to reproduce contents-data, and the larger the numerical value is, the stronger the desire of the user to reproduce the contents-data is.

The reproduction priority is calculated by the system controlling unit 108 which will be described later.

In the image processing apparatus 1 according to the embodiment, high reproduction priority is given to contents-data having the high reproduction frequency. As a result, contents-data whose reproduction priority Sx is low and for which user's reproduction desire is weak is preferentially compressed.

A method of calculating the reproduction frequency Sx is as follows.

(Category of "Reproduced Contents-data")

The reproduction frequency Sx corresponding to contents-data belonging to the category of "reproduced contents-data" is calculated by the following Equation 2.

$$Sx = Sj \quad \text{Equation 2}$$

where Sj denotes the reproduction frequency of a genre to which the contents-data belongs.

(Category of "Un-reproduced Contents-data")

The reproduction frequency Sx corresponding to contents-data belonging to the category of "un-reproduced contents-data" is calculated on the basis of the following Equations 3 to 5 using the number of days from the recording day of contents-data. It will be described concretely as follows.

i) In the case where D<3 days where D denotes the number of the days from the recording day $$Sx = Sj\max + 1/D \quad \text{Equation 3}$$

ii) In the case where 4 days<D<one month $$Sx = Sjave + 1/D \quad \text{Equation 4}$$

iii) In the case where D>1 month $$Sx = Sj + 1/D \quad \text{Equation 5}$$

Sjmax in Equation 3 denotes the maximum value of all of the reproduction frequencies Sj, Sjave in Equation 4 denotes an average value of all of the reproduction frequencies Sj, and Sj in Equation 5 indicates the reproduction frequency of a genre to which the contents-data belongs.

For a plurality of contents whose reproduction frequency Sx is the same in the same category, higher reproduction priority is given in order from the latest recording date and time. The reproduction frequency Sx fluctuates according to the reproduction frequency Sj, and the number of days from the recording day, for each genre as shown by Equations 2 to 5. Consequently, when those values fluctuate, the reproduction frequency Sx is updated.

Further, a recording reservation table TBL3 shown in FIG. 4 is stored in the table recording unit 107. As shown in FIG. 4, the recording reservation table TBL3 in the embodiment has fields for storing the parameter indicative of the broadcast channel of contents to be recorded on recording reservation date and time so as to be associated with the date and time.

The table recording unit 107 may take the form of an internal memory such as an EEPROM or SRAM, an external memory such as an XD card (trademark), or an IC card such as an SIM (Subscriber Identity Module).

The system controlling unit 108 has a CPU (Central Processing Unit), a ROM (Read Only Memory), a RAM (Random Access Memory), an EEPROM, and the like, which are not shown, and controls the components of the image processing apparatus 1 by executing various applications stored in the ROM.

Figure 5:
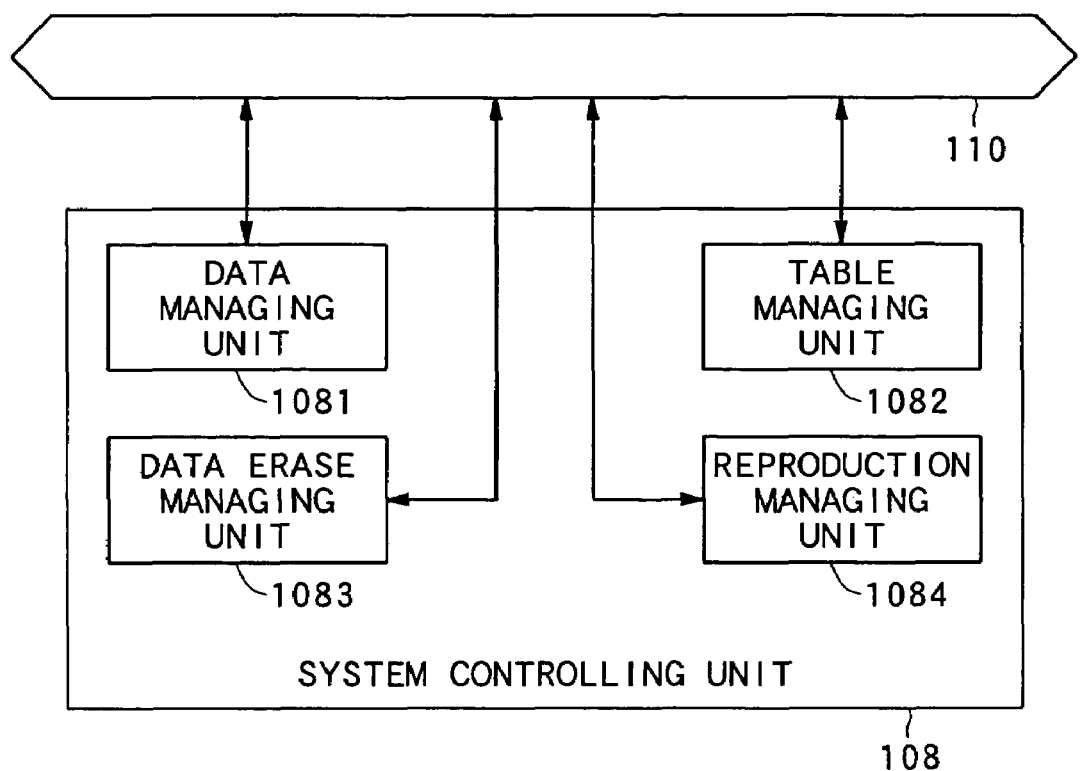
FIG. 5 is a block diagram showing functions realized when a CPU executes an application in a system controlling unit 108 in the first embodiment.

A concrete configuration of the system controlling unit 108 will now be described with reference to FIG. 5. FIG. 5 is a block diagram showing the configuration of the system controlling unit 108.

As shown in the diagram, the system controlling unit 108 according to the embodiment has a data managing unit 1081, a table managing unit 1082, a data erase managing unit 1083, and a reproduction managing unit 1084.

The data managing unit 1081 manages recording of broadcast data supplied from the TV receiving unit 101. Concretely, the data managing unit 1081 updates the recording reservation table TBL3 in accordance with an input signal corresponding to an input operation of the user supplied from the user I/F unit 105. At the reserved recording date and time stored in the table TBL3, the data managing unit 1081 outputs a tune frequency change signal to the TV receiving unit 101 via the data bus 110, and sends a control signal to the main recording apparatus 102.

Consequently, the TV receiving unit 101 receives broadcast data corresponding to a reserved channel, and contents-data included in the broadcast data is recorded in the main recording apparatus 102. On the other hand, metadata included in the broadcast data is written into the metadata recording unit 106 by the data managing unit 1081. As a result, in the image processing apparatus 1 according to the embodiment, the contents-data and the metadata are separately managed.

The data erase managing unit 1083 manages compression/erasure of data recorded in the main recording apparatus 102 and the auxiliary recording apparatus 103 by executing the following processes.

(Process 1: Determination of Object to be Erased/Compressed)

This process is performed by using, as a trigger, the end of recording of broadcast contents designated by the user to compress contents-data recorded in the main recording apparatus 102 by the picture rate converting apparatus 109 and then to record the compressed contents-data into the auxiliary recording apparatus 103. In this process, the data erase managing unit 1083 determines whether the proportion of use in total storage capacity of the main recording apparatus 102 exceeds a predetermined threshold or not. Although the threshold may be arbitrary, it is assumed that the threshold is set to "65%" in the embodiment. When it is determined that the proportion exceeds the threshold, the data erase managing unit 1083 selects contents-data which is thought to be unnecessary in consideration of preferences of the user from all of contents-data recorded in the main recording apparatus 102. Specifically, the data erase managing unit 1083 selects contents-data having low reproduction priority in the contents management table TBL1 as an object to be compressed, and outputs a control signal including a data sequence indicative of the object to be compressed to the picture rate converting apparatus 109. Consequently, contents-data corresponding to the object to be compressed is read from the main recording apparatus 102 by the picture rate converting apparatus 109, compressed, and recorded in the auxiliary recording apparatus 103, and the contents-data is erased from the main recording apparatus 102.

(Process 2: Erasure from Auxiliary Recording Apparatus 103)

The process is performed when the data amount of compressed contents-data to be recorded in the auxiliary recording apparatus 103 exceeds the free space in the auxiliary recording apparatus 103 at the time of execution of the process 1. In the process 2, the data erase managing unit 1083 selects compressed contents-data to be erased from the compressed contents-data recorded in the auxiliary recording apparatus 103, and erases the compressed contents-data from the auxiliary recording apparatus 103. In the process 2, the compressed contents-data recorded in the auxiliary recording apparatus 103 is selectively erased in order from the oldest data and time of recording.

(Process 3: Determination of Compressing Method in Picture Rate Converting Apparatus 109)

The data erase managing unit 1083 selects a compressing method at the time of compressing contents-data in the picture rate converting apparatus 109.

The reproduction managing unit 1084 controls reproduction of contents-data recorded in the main recording apparatus 102 and compressed contents-data recorded in the auxiliary recording apparatus 103. Concretely, the reproduction managing unit 1084 outputs a control signal to the image display unit 104 in accordance with an input signal corresponding to an input operation of the user sent from the user I/F unit 105. When the control signal is transmitted, the image display unit 104 reads contents-data or the like recorded in the main recording apparatus 102 or auxiliary recording apparatus 103, and performs displaying process. As a result, an image corresponding to the contents-data or the like is displayed on a monitor 2.

The table managing unit 1082 calculates the reproduction frequency Sj of each genre and the reproduction frequency Sx corresponding to each of contents-data, and manages and updates the genre management table TBL1 and the contents management table TBL2. The timing at which the table managing unit 1082 calculates the reproduction frequencies Sj and Sx and updates the tables TBL1 and TBL2 is as follows.
i) Timing 1: when recording of contents-data is finished
ii) Timing 2: when reproduction of contents-data is finished
iii) Timing 3: when compression/re-recording of contents-data is finished.

The table managing unit 1082 performs a process of determining not only the above timing but also the number of regrets Xm. When a change occurs in the number of regrets Xm, the table managing unit 1082 calculates the reproduction frequencies Sj and Sx, and updates the tables TBL1 and TBL2.

Figure 6:
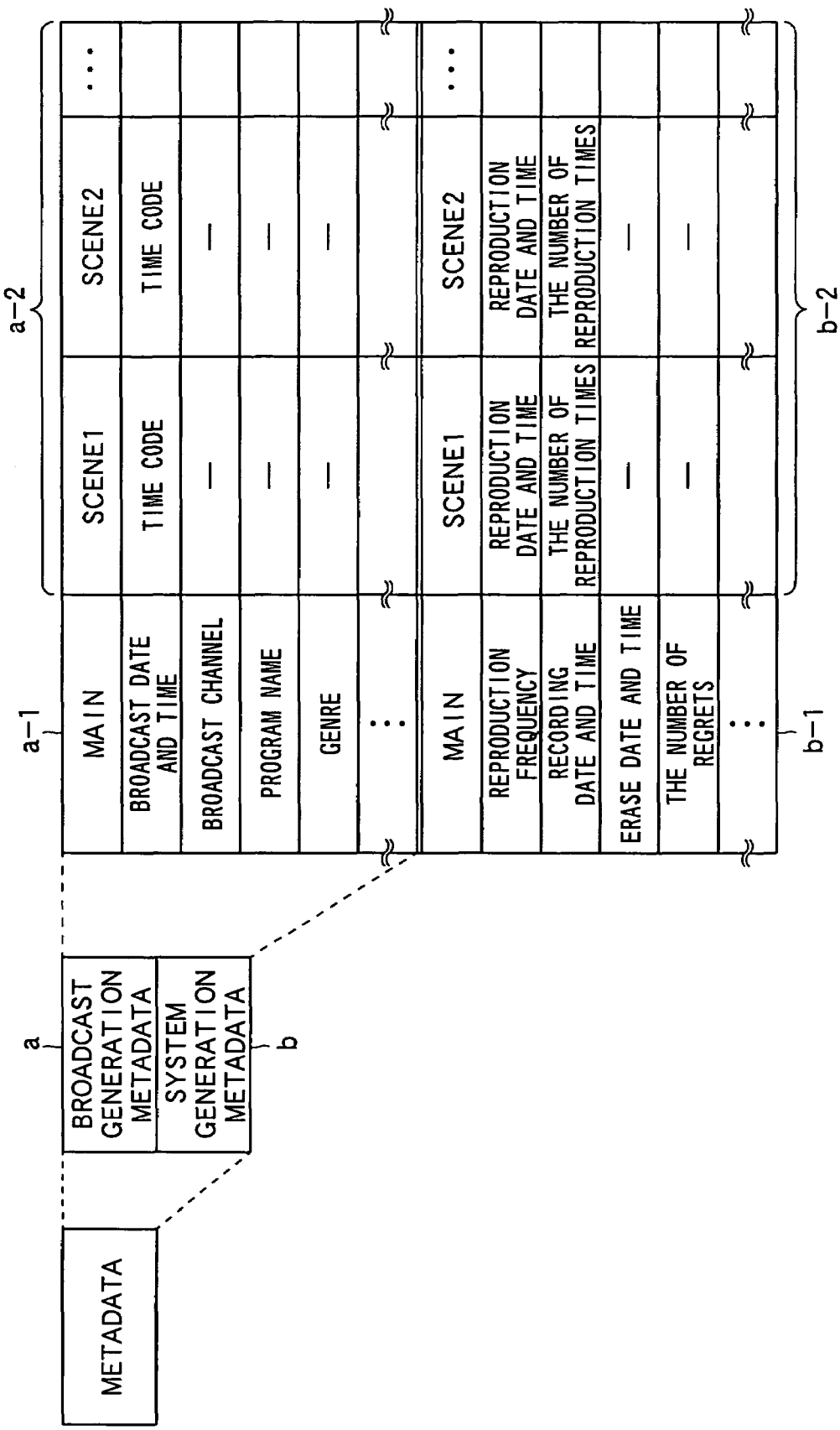
FIG. 6 is a diagram showing the format of metadata stored in a metadata recording unit 106 in the first embodiment.

The metadata recording unit 106 stores a memory address corresponding to a recording position of each contents-data and metadata so as to be associated with each other. The metadata recorded in the metadata recording unit 106 is constructed by, as shown in FIG. 6, broadcast station generation metadata "a" and system generation metadata "b".

The broadcast station generation metadata "a" is metadata transmitted to be multiplexed with broadcast data, and is constructed by, for example, information a-1 one-to-one corresponding to contents such as broadcast date and time, broadcast station, program name, and genre in a one-to-one correspondence manner, and information a-2 one-to-one corresponding to a plurality of scenes constructing contents such as a time code.

On the other hand, the system generation metadata "b" is metadata generated in the image processing apparatus 1 in the embodiment, and is constructed by, for example, information b-1 one-to-one corresponding to contents such as the reproduction frequency Sx, recording date and time, and erase date, and time and information b-2 one-to-one corresponding to scenes. The metadata storing unit 106 may take the form of an internal memory such as an EEPROM or SRAM in a manner similar to the table recording unit 107, an external memory such as an XD card (trademark), or an IC card such as an SIM (Subscriber Identify Module).

The image display unit 104, under control of the system controlling unit 108, decodes contents-data and compressed contents-data recorded in the main recording apparatus 102 and the auxiliary recording apparatus 103, converts the data to a motion picture signal and a sound signal, and outputs them to the monitor 2. As a result, a motion picture corresponding to the contents-data is displayed, and sound is output, from the monitor 2.

As described above, in the embodiment, contents-data may be encoded in a form other than the MPEG form when recorded in the auxiliary recording apparatus 103 (the above compressing method 3). In order to decode the compressed contents-data, the image display unit 104 in the embodiment is also provided with decoders adapted to forms other than the MPEG form, and these decoders are arranged to be selectively used under control of the system controlling unit 108.

1.2 Operation of Embodiment (1) Operation at the Time of Recording Contents-data (i) Outline of Entire Operation With reference to FIG. 7 as a graph showing a change in the storage amount of the main recording apparatus 102, operation of recording contents-data in the image processing apparatus 1 according to the embodiment will be described.

To make the following description more concrete, it is now assumed that "contents-data 1" and "contents-data 2" are already recorded in the main recording apparatus 102. In FIG. 7, the vertical axis indicates the proportion of a used storage area in the total storage capacity of the main recording apparatus 102, the horizontal axis denotes time, and the threshold is "65%".

First, when the user operates the user I/F unit 105 to turn on the image processing apparatus 1, contents-data received by the TV receiving unit 101 is decoded by the image display unit 104 under control of the reproduction managing unit 1084 in the system controlling unit 108, and the decoded signal is supplied as an image signal and the like to the monitor 2. As a result, an image corresponding to contents being broadcasted is displayed on the monitor 2.

In the case of recording broadcast contents in this state, the user has to perform a predetermined operation on a not-shown operator in the user I/F unit 105 or external remote controller. The operation in this case is arbitrary. For example, the configuration may be such that a recording reservation button is provided for an operator or external remote controller and, when the button is depressed, an image corresponding to a reservation screen is output to the monitor 2, and recording reservation date and time and the like are designated on the screen. Alternately, it may be such that a liquid crystal display is provided for the user I/F unit 105 or an external remote controller, a screen for designating recording reservation date and time, broadcast channel, and the like are displayed on the display, and recording reservation is made.

Figure 7:
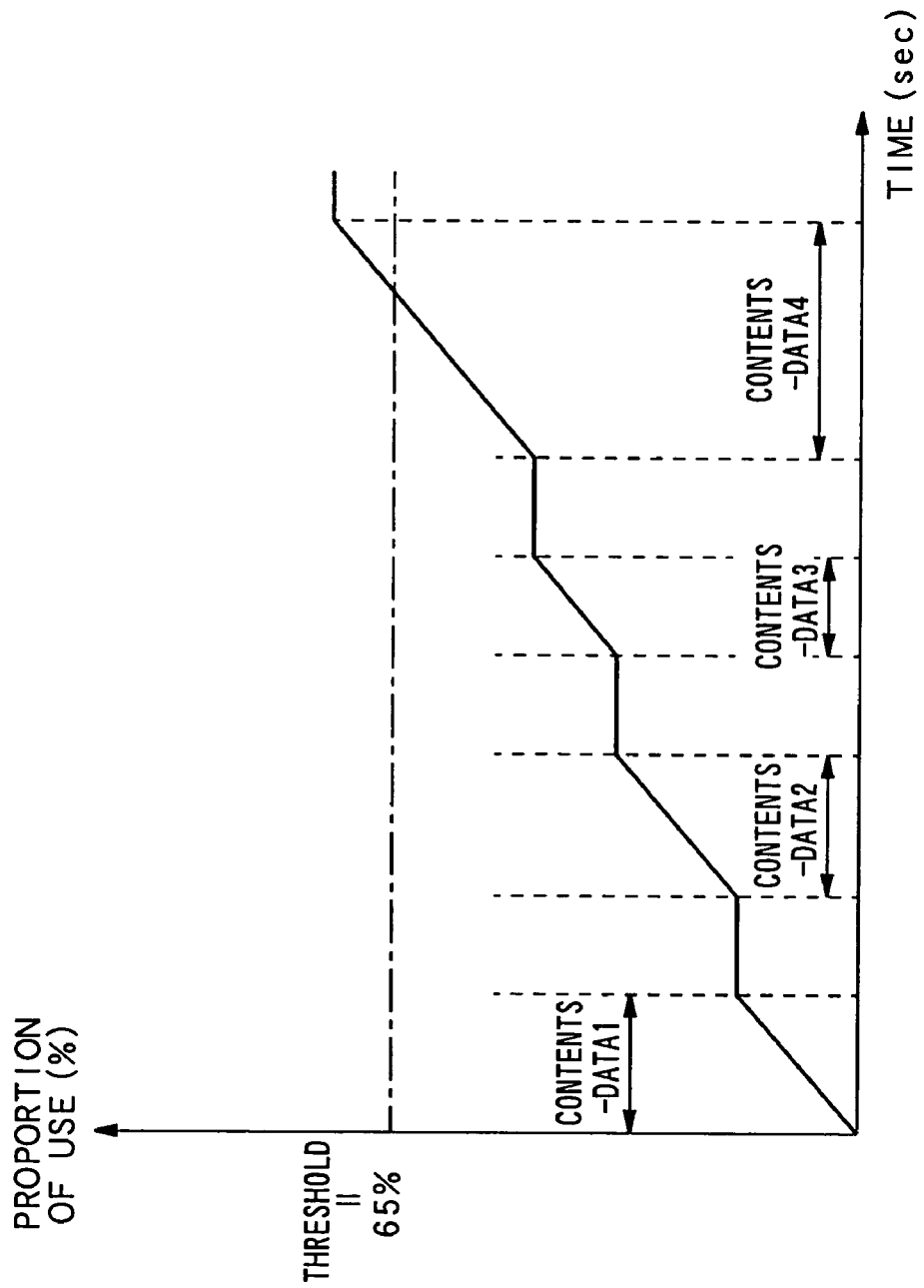
FIG. 7 is a graph showing a change in a storage amount of contents-data in a main recording apparatus 102 in the first embodiment.

At the time of recording reservation, for example, the user enters data to the user I/F unit 105 to record contents to be broadcasted in "5ch" for the period of "21:00 to 23:30 on Dec. 17, 2003" to record "contents-data 3" in FIG. 7. The data managing unit 1081 in the system controlling unit 108 updates the recording reservation table TBL3 in accordance with an input signal corresponding to an input operation of the user sent from the user I/F unit 105. Concretely, the data managing unit 1081 stores information as shown in the second line in the example of the table in FIG. 4 into the recording reservation table TBL3.

After the process is executed, and at "21:00 on Dec. 17, 2003", the data managing unit 1081 outputs a tuning frequency change signal to the TV receiving unit 101 via the data bus 110, and sends a control signal to the main recording apparatus 102. As a result, broadcast data corresponding to a reservation channel is sequentially received by the TV receiving unit 101, the "contents-data 3" is recorded in the main recording apparatus 102, and metadata included in the broadcast data is written into the metadata recording unit 106. At this time, the data managing unit 1081 generates, for example, the system generation metadata "b" constructed by parameters such as reproduction date and time, and writes it to the metadata recording unit 106.

After that, at time "23:30 on Dec. 17, 2003", the data managing unit 1081 sends again a control signal to the main recording apparatus 102. In the main recording apparatus 102, recording of the "contents-data 3" is stopped. At this time, the data managing unit 1081 stops recording of the metadata.

Figure 8:
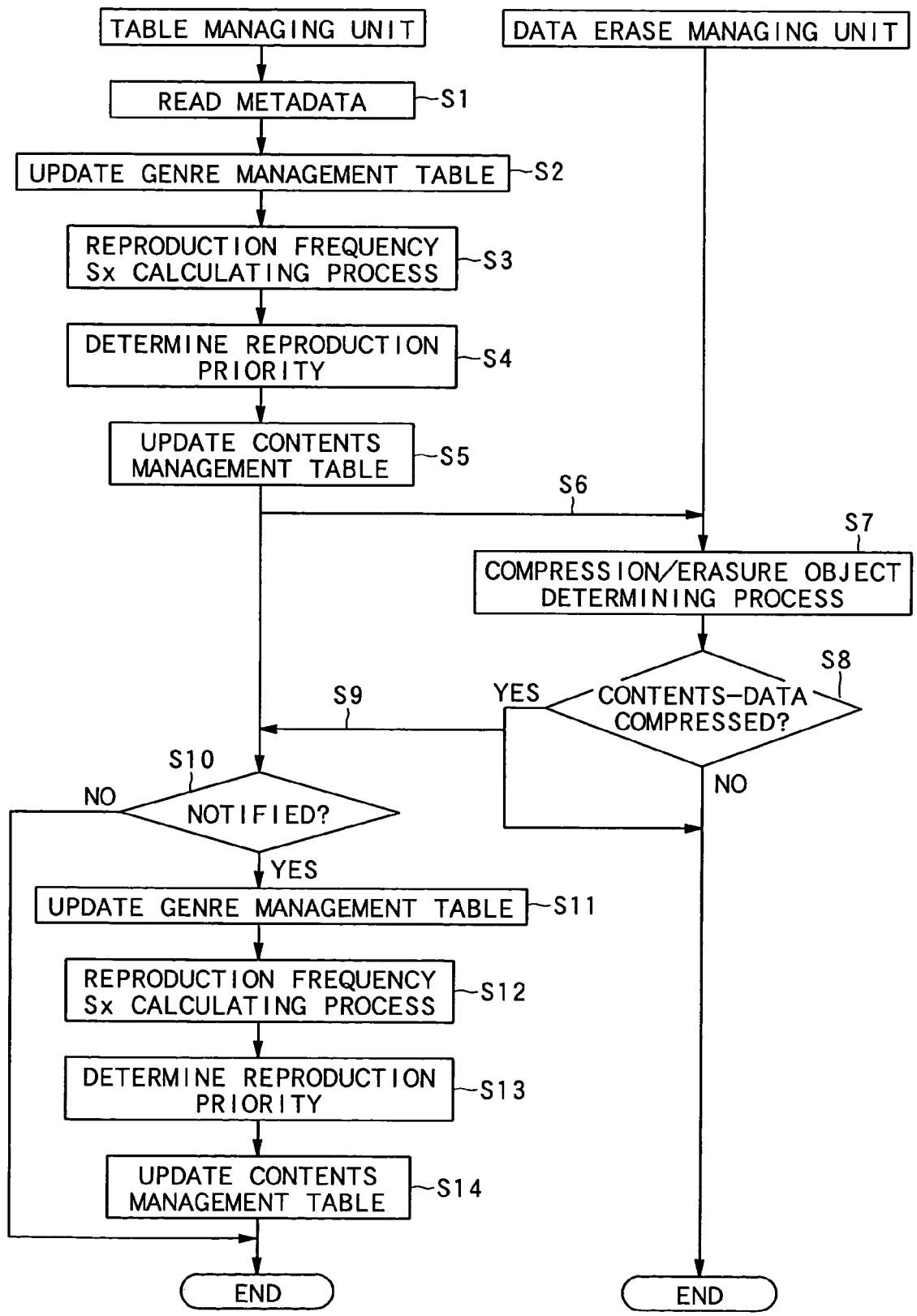
FIG. 8 is a sequence chart showing processes executed in the system controlling unit 108 in the image processing apparatus 1 in the first embodiment.

On the other hand, by using the end of recording of the "contents-data 3" as a trigger, the process shown in FIG. 8 is executed in the image processing apparatus 1. In the process, first, the metadata corresponding to the "contents-data 3" reserved and recorded by the table managing unit 1082 is read, and developed to a not-shown RAM in the system controlling unit 108 (step S1).

After that, the table managing unit 1082 extracts information indicative of "genre" included in the broadcast station generation metadata "a" of the metadata. When the information indicative of "genre" is extracted in such manner, the table managing unit 1082 increments the counter of the number of recording contents Xr corresponding to the genre in the genre management table TBL1 only by "1", thereby updating the genre management table TBL1 (step S2).

After that, the table managing unit 1082 executes a reproduction frequency Sx calculating process (step S3).

Figure 9:
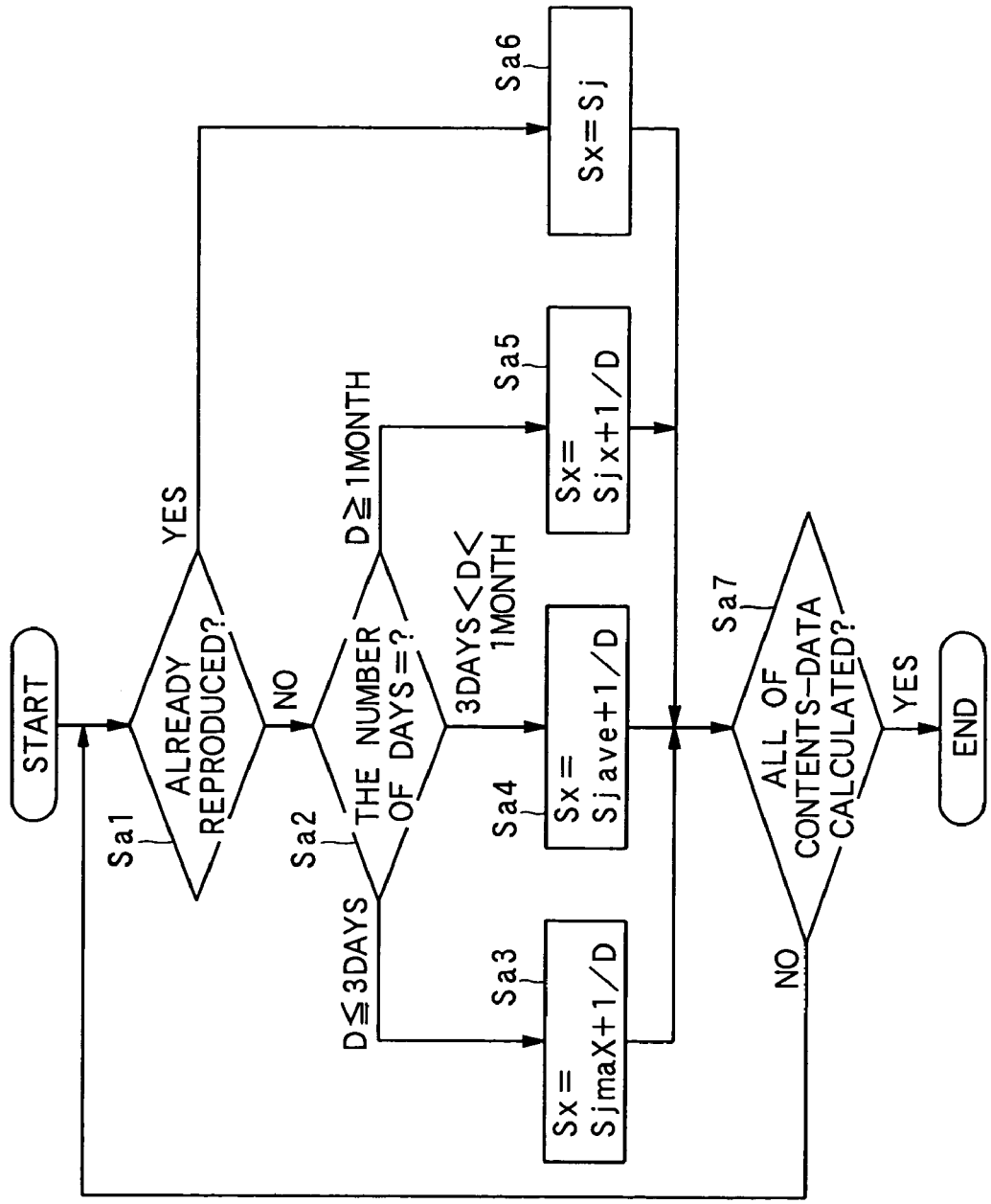
FIG. 9 is a flowchart showing processes executed by a table managing unit 1082 in the system controlling unit 108 in the first embodiment.

With reference to FIG. 9, the reproduction frequency Sx calculating process performed by the table managing unit 1082 in step S3 will be described. FIG. 9 is a flowchart showing the reproduction frequency Sx calculating process.

In the process, first, the table managing unit 1082 determines whether contents-data to be subjected to the reproduction frequency Sx calculation has been already reproduced or not (step Sa1 in FIG. 9). In the case where contents-data to be calculated has been already reproduced, the table managing unit 1082 determines "yes" in step Sa1, and calculates the reproduction frequency Sx in accordance with Equation 2 (step Sa6 in FIG. 9).

In contrast, when the contents-data to be subjected to reproduction frequency Sx calculation has not been reproduced yet, the table managing unit 1082 determines "no" in step Sa1, and executes step Sa2. In step Sa2, the table managing unit 1082 calculates elapsed dates D from the recording date and time of the contents-data to be subjected to the reproduction frequency Sx calculation to the present, and determines whether the value of D belongs to, (i) $D \leq 3$ days, (ii) 4 days<D<1 month, or (iii) $D \geq 1$ month.

In the case where the table managing unit 1082 determines (i) $D \leq 3$ days, the reproduction frequency Sx is calculated by Equation 3. When the table managing unit 1082 determines (ii) 4 days<D<1 month, the reproduction frequency Sx is calculated by the equation 4. When the table managing unit 1082 determines (iii) $D \geq 1$ month, the reproduction frequency Sx is calculated by the equation 5 (steps Sa3, Sa4, and Sa5 in FIG. 9). For example, in the case of the "contents-data 3" in the operation example, since it has just been recorded, "no" is determined in step Sa1, and (i) is determined in step Sa2. As a result, the reproduction frequency Sx is calculated in step Sa3.

After the reproduction frequency Sx is calculated in such manner, the table managing unit 1082 determines whether calculation of the reproduction frequencies Sx corresponding to all of contents-data recorded in the main recording apparatus 102 have been finished or not (step Sa7 in FIG. 9). When it is determined as "no", the table managing unit 1082 repeats the processes in steps Sa1 to Sa6 again, thereby calculating the reproduction frequencies Sx corresponding to all of contents-data in the main recording apparatus 102. On the other hand, when it is determined as "yes" in step Sa7, the table managing unit 1082 finishes the process.

When the reproduction frequency Sx calculating process in step S3 is finished, and the reproduction frequency Sx corresponding to contents-data is calculated, the table managing unit 1082 determines reproduction priority corresponding to contents-data on the basis of the calculated reproduction frequency Sx (step S4). Concretely, the table managing unit 1082 assigns high reproduction priority in order from the highest reproduction frequency Sx calculated.

The table managing unit 1082 updates the contents managing table TBL2 on the basis of the obtained reproduction priority (step S5). At this time, the table managing unit 1082 uses the RAM of the system controlling unit 108 as a work area, extracts information such as "title" and "genre" from metadata corresponding to contents-data, and stores it into the contents managing table TBL2 to be associated with the reproduction priority. After completion of updating of the table in such a manner, the table managing unit 1082 notifies the data erase managing unit 1083 of the completion of the process (step S6).

On the other hand, on receipt of the notification from the table managing unit 1082, the data erase managing unit 1083 executes an erasure/compression object determining process (step S7). The process will be described in detail later. In the process, the table managing unit 1082 determines whether the use proportion of the main recording apparatus 102 exceeds the threshold "65%" or not. If it is determined that that use proportion exceeds the threshold, contents-data to be erased/compressed is determined from all of contents-data stored in the main recording apparatus 102. In the case of the operation example, at the time point when recording of the "contents-data 3" is finished as shown in FIG. 7, the use proportion does not exceed the threshold yet. Therefore, the table managing unit 1082 finishes the erasure/compression object determining process without determining contents-data to be erased/compressed.

After completion of the erasure/compression object determining process, the data erase managing unit 1083 determines whether contents-data determined to be compressed in step S7 exists or not (step S8). As described above, in the case of the operation example, on completion of recording of the "contents-data 3", contents-data in the main recording apparatus 102 is not an object to be compressed. Consequently, the data erase managing unit 1083 determines "no" in step S8, and finishes the process. As a result, it is determined as "no" in step S10 also in the table managing unit 1082, and all of processes in the image processing apparatus 1 are finished.

Subsequently, when the user newly records "contents-data 4", the user has to perform again an operation for recording reservation for the user I/F unit 105. After the operation is performed, the recording reservation table TBL3 is updated, recording of "contents-data 4" and metadata is performed, and the process of updating the genre management table TBL1 and the contents management table TBL2 is performed (steps S1 to S5).

On the other hand, when updating of the tables TBL1 and TBL2 is completed, and a notification from the table managing unit 1082 is received (step S6), the data erase managing unit 1083 executes the erasure/compression object determining process (step S7).

Figure 10:
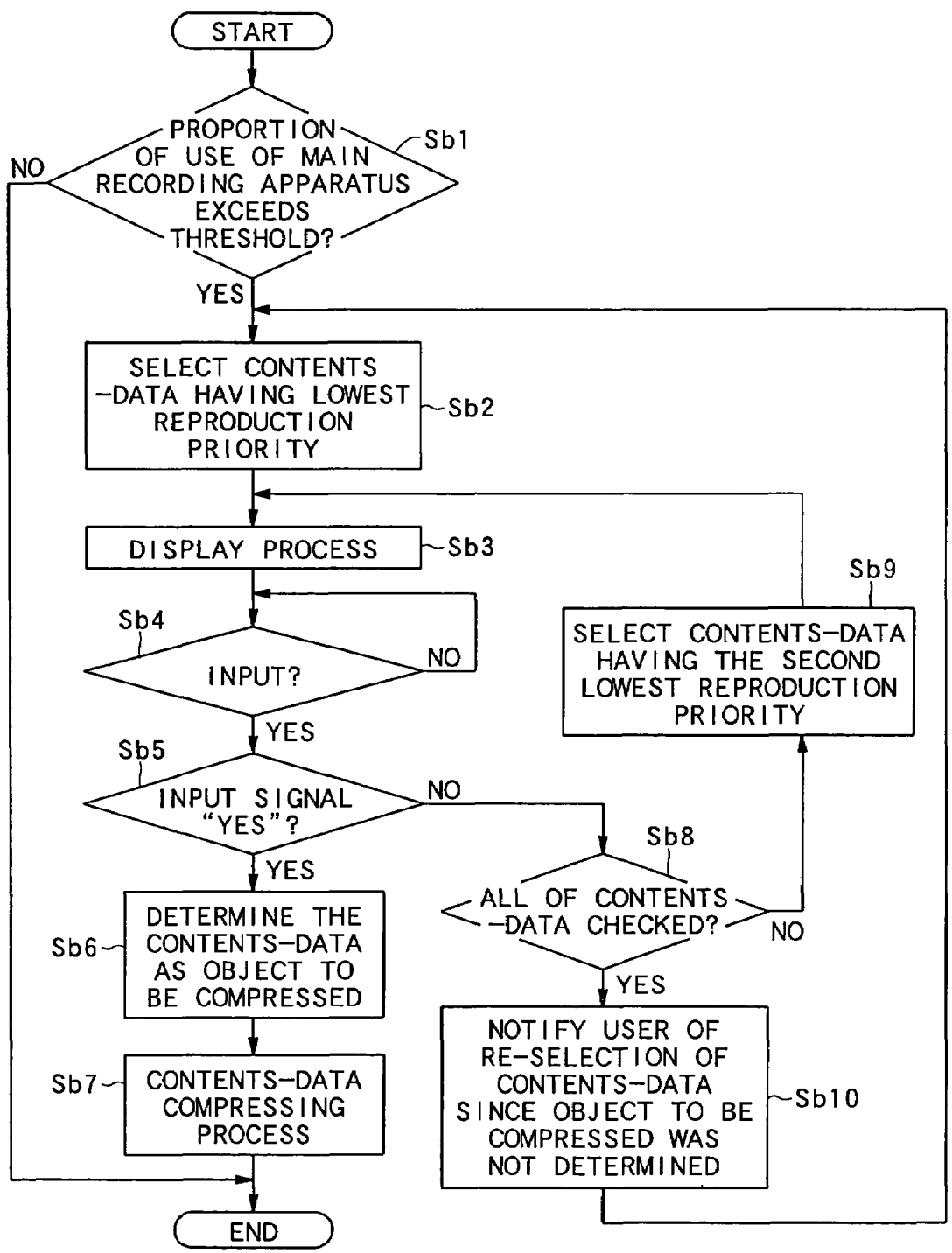
FIG. 10 is a flowchart showing processes executed by a data erase managing unit 1083 in the system controlling unit 108 in the first embodiment.

By referring to FIG. 10, the erasure/compression object determining process will be described in detail. FIG. 10 is a flowchart showing the contents of the erasure/compression object determining process executed by the data erase managing unit 1083 in step S7.

In the process, first, the data erase managing unit 1083 determines whether the proportion of the used storage area in the whole storage capacity of the main recording apparatus 102 exceeds the threshold or not (step Sb1 in FIG. 10).

When "no" is determined, the data erase managing unit 1083 finishes the process. For example, at the time of recording the "contents-data 3", "no" is determined in step Sb1. As a result, the process is finished.

On the other hand, at the time when recording of the "contents-data 4" is finished, as shown in FIG. 7, the proportion of use in the main recording apparatus 102 exceeds the threshold. Consequently, in step Sb1, the data erase managing unit 1083 determines "yes", and selects contents-data having the lowest reproduction priority in the contents management table TBL2 (step Sb2 in FIG. 10). Describing the case shown in FIG. 3 as an example, contents-data having the title "hhh" has the lowest reproduction priority. In such a case, the data erase managing unit 1083 selects contents-data corresponding to the title "hhh" as an object to be compressed.

The data erase managing unit 1083 generates image data corresponding to a confirmation screen for confirming to the user whether the selected contents-data may be compressed or not, outputs the image data to the image display unit 104 (step Sb3 in FIG. 10), and enters a mode of waiting for an input from the user ("no" in step Sb4 in FIG. 10). As a result of the process, an image corresponding to the confirmation screen is displayed on the monitor 2. The configuration of the confirmation screen is arbitrary. For example, the title name of contents-data selected as an object to be compressed and a character train such as "Are you sure you want to erase it?" may be displayed with buttons "yes" and "no".

On the other hand, when the user performs an input operation of selecting "yes" or "no" for the user I/F unit 105 in accordance with the confirmation screen, an input signal corresponding to the input operation is sent to the system controlling unit 108, and "yes" is determined in step Sb4. As a result, the data erase managing unit 1083 determines whether the input signal corresponds to "yes" or not (step Sb5 in FIG. 10).

In the case where the user performs an input operation of selecting "no" for the user I/F unit 105, the data erase managing unit 1083 determines as "no" in step Sb5, and determines whether the user has already confirmed all of the contents-data or not (step Sb8 in FIG. 10). When it is determined that confirmation for all of contents-data has not yet been finished ("no" in step Sb8 in FIG. 10) the data erase managing unit 1083 selects contents-data having the second lowest reproduction priority in the contents management table TBL2 (step Sb9 in FIG. 10), and repeats the processes in steps Sb3 to Sb5 again. The processes are sequentially repeated in order from the lowest reproduction priority until "yes" is determined in step Sb5.

When these processes are repeated, and it is determined in step Sb8 that confirmation of all of contents-data is finished ("yes"), the data erase managing unit 1083 generates image data including a character train of "A title to be erased is not determined. So check again", outputs the image data to the image display unit 104, and repeats the processes in steps Sb2 to Sb5 and steps Sb8 to Sb10 again.

On the other hand, when the user performs an input operation of selecting "yes" for the user I/F unit 105, the data erase managing unit 1083 determines "yes" in step Sb5, determines the contents-data as an object to be compressed (step Sb6 in FIG. 10), executes the contents-data compressing process (step Sb7 in FIG. 10), and finishes the process. The contents-data compressing process will be described in detail later. By the process, contents-data determined as an object to be compressed in step Sb6 is compressed, and recorded in the auxiliary recording apparatus 103. In addition, the contents-data is erased from the main recording apparatus 102.

After the erasure/compression object determining process mentioned above (step S7) is finished, the data erase managing unit 1083 determines whether the contents-data determined to be compressed in step S7 exists or not (step S8). In the case of the operation example, on completion of recording of the "contents-data 4", the contents-data in the main recording apparatus 102 has been erased/compressed. Consequently, the data erase managing unit 1083 determines "yes" in step S8, and notifies the table managing unit 1082 of the result.

On the other hand, when the notification is received from the data erase managing unit 1083, the table managing unit 1082 determines "yes" in step S10 in FIG. 8, and updates the genre management table TBL1 (step S11). Concretely, the table managing unit 1082 increments the counter of the number of compressed contents Xd in the genre management table TBL1 by only "1", and decrements the counter of the number of recording contents Xr by only "1".

Subsequently, the table managing unit 1082 executes the process of calculating the reproduction frequency Sx (step S12), and determines the reproduction priority corresponding to each contents-data (step S13). Since the operation is similar to that in FIG. 9, its detailed description will be omitted.

After completion of the process, the table managing unit 1082 updates the contents management table TBL2 (step S14). Concretely, the table managing unit 1082 changes a category corresponding to contents-data to be compressed in the contents management table TBL2 to the "erased contents-data" category, and stores "temporary erased" information including information corresponding to the compressing method into the field of "erase state". At this time, the table managing unit 1082 also updates reproduction priority corresponding to each contents-data. After the series of processes is finished, all of the processes in the image processing apparatus 1 are finished.

(ii) Contents-data Compressing Process

Figure 11:
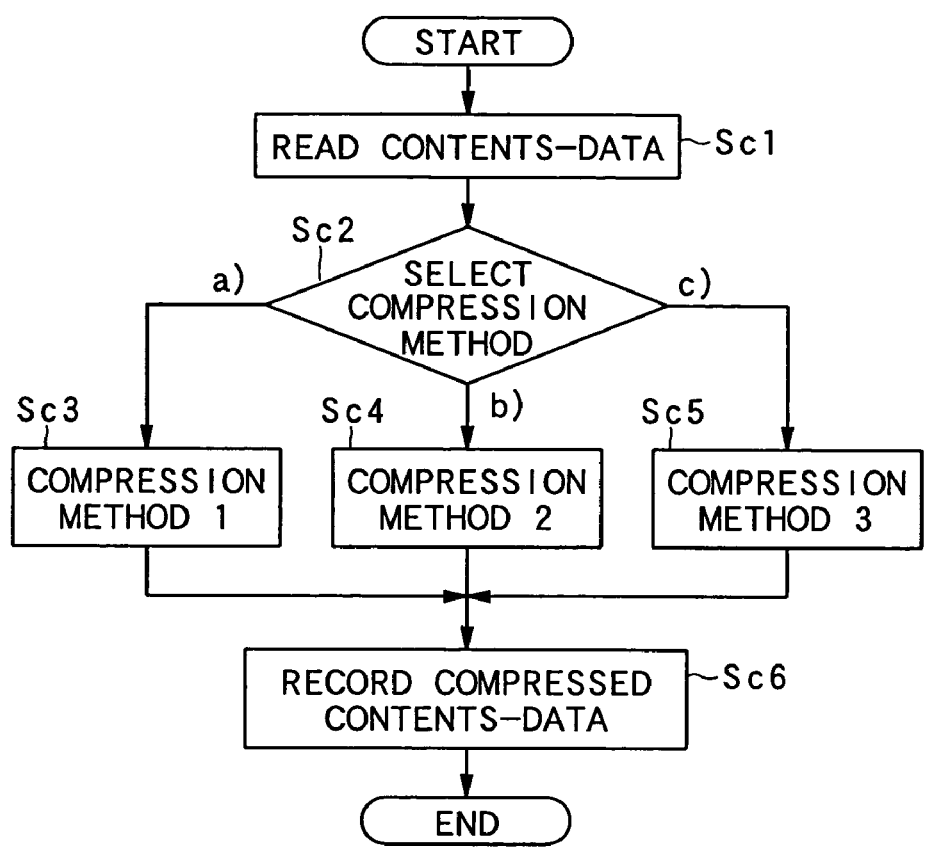
FIG. 11 is a flowchart showing processes executed by the data erase managing unit 1083 in the system controlling unit 108 in the first embodiment.

Referring now to FIG. 11, the contents-data compressing process executed in step Sb7 in FIG. 10 will be described. FIG. 11 is a flowchart showing the contents of the contents-data compressing process executed in step Sb7.

In the process, first, the data erase managing unit 1083 outputs a control signal to the picture rate converting apparatus 109 to make the picture rate converting apparatus 109 read contents-data to be compressed (step Sc1). The data erase managing unit 1083 then selects a method of compressing the contents-data (step Sc2). In the step Sc2, the data erase managing unit 1083 selects a compressing method as follows.

a) In the Case Where the Compressing Method 1 Mentioned Above is Selected

In the case where contents corresponding to the contents-data to be compressed belong to genres such as sports and movies in which motion in a picture is large, the data erase managing unit 1083 selects the compressing method 1. In the case of such contents-data, the difference between frames is large. Consequently, if contents-data is compressed by the compressing method 2 mentioned above, interframe interpolation cannot be performed, and an image deteriorates terribly. In such a case, the data erase managing unit 1083 selects the compressing method 1 mentioned above. In this case, a method of determining whether contents corresponding to the contents-data belong to a genre in which motion in a picture is large or not is arbitrary. In the embodiment, however, it is assumed that the determination is made on the basis of a motion vector included in motion picture data in contents-data.

b) In the Case where the Compressing Method 2 Mentioned Above is Selected

In the case where contents corresponding to contents-data to be compressed belong to genres of, for example, news, documentary, and the like in which motion in a picture is small, the data erase managing unit 1083 selects the compressing method 2. In the case of such contents-data, the difference between frames is small. Consequently, even if the compressing method 2 mentioned above is employed, a picture does not deteriorate largely. At this time, a method of determining whether contents corresponding to the contents-data belong to a genre in which a motion in a picture is large or not is similar to the above.

c) In the Case where the Compressing Method 3 Mentioned Above is Selected

In the case where an amount of contents-data to be compressed is small, and is, for example, less than 1 GByte, the data erase managing unit 1083 selects the compressing method 3.

When the compressing method is selected in such a manner, the data erase managing unit 1083 outputs a control signal indicative of the selected compressing method to the picture rate converting apparatus 109, and compresses the contents-data by the compressing method (steps Sc3 to Sc5). After completion of the data compression, the data erase managing unit 1083 executes the compressed contents-data recording process (step Sc6), and finishes the process.

Figure 12:
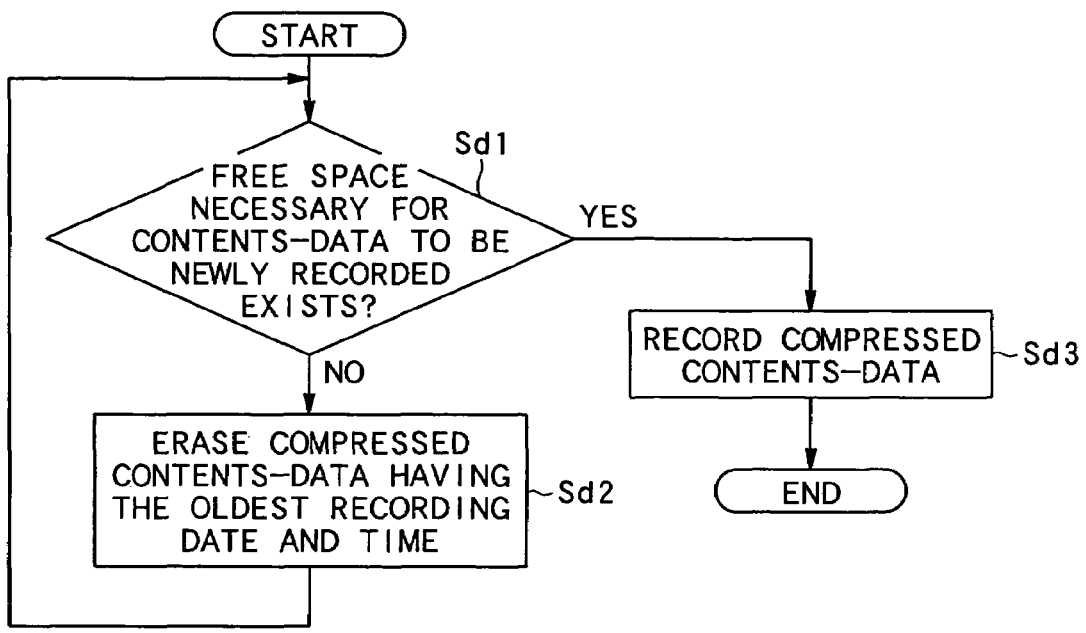
FIG. 12 is a flowchart showing processes executed by the data erase managing unit 1083 in the system controlling unit 108 in the first embodiment.

The compressed contents-data recording process performed in step Sc6 will be described with reference to FIG. 12. FIG. 12 is a flowchart showing the contents of the recording process.

As shown in the diagram, in the process, the data erase managing unit 1083 in the embodiment determines whether or not free space in the auxiliary recording apparatus 103 exceeds a storage capacity necessary to record the compressed contents-data to be newly recorded (step Sd1 in FIG. 12). In the case where it is determined that free space necessary to record the compressed contents-data does not exist in the auxiliary recording apparatus 103 ("no" in step Sd1 in FIG. 12), the data erase managing unit 1083 erases the compressed contents-data having the oldest recording date and time recorded in the auxiliary recording apparatus 103 from the auxiliary recording apparatus 103 (step Sd2 in FIG. 12). The data erase managing unit 1083 then repeats the processes in steps Sd1 and Sd2 until the free space in the auxiliary recording apparatus 103 becomes to the capacity necessary to record the compressed contents-data.

When the process is repeated, and free space for recording the compressed contents-data is assured in the auxiliary recording apparatus 103, the data erase managing unit 1083 determines "yes" in step Sd1, outputs a control signal to the picture rate converting apparatus 109 (step Sd3 in FIG. 12), and finishes the contents-data compressing process. As a result, the picture rate converting apparatus 109 records the compressed contents-data in the auxiliary recording apparatus 103, and erases the contents-data corresponding to the compressed contents-data from the main recording apparatus 102.

Figure 13:
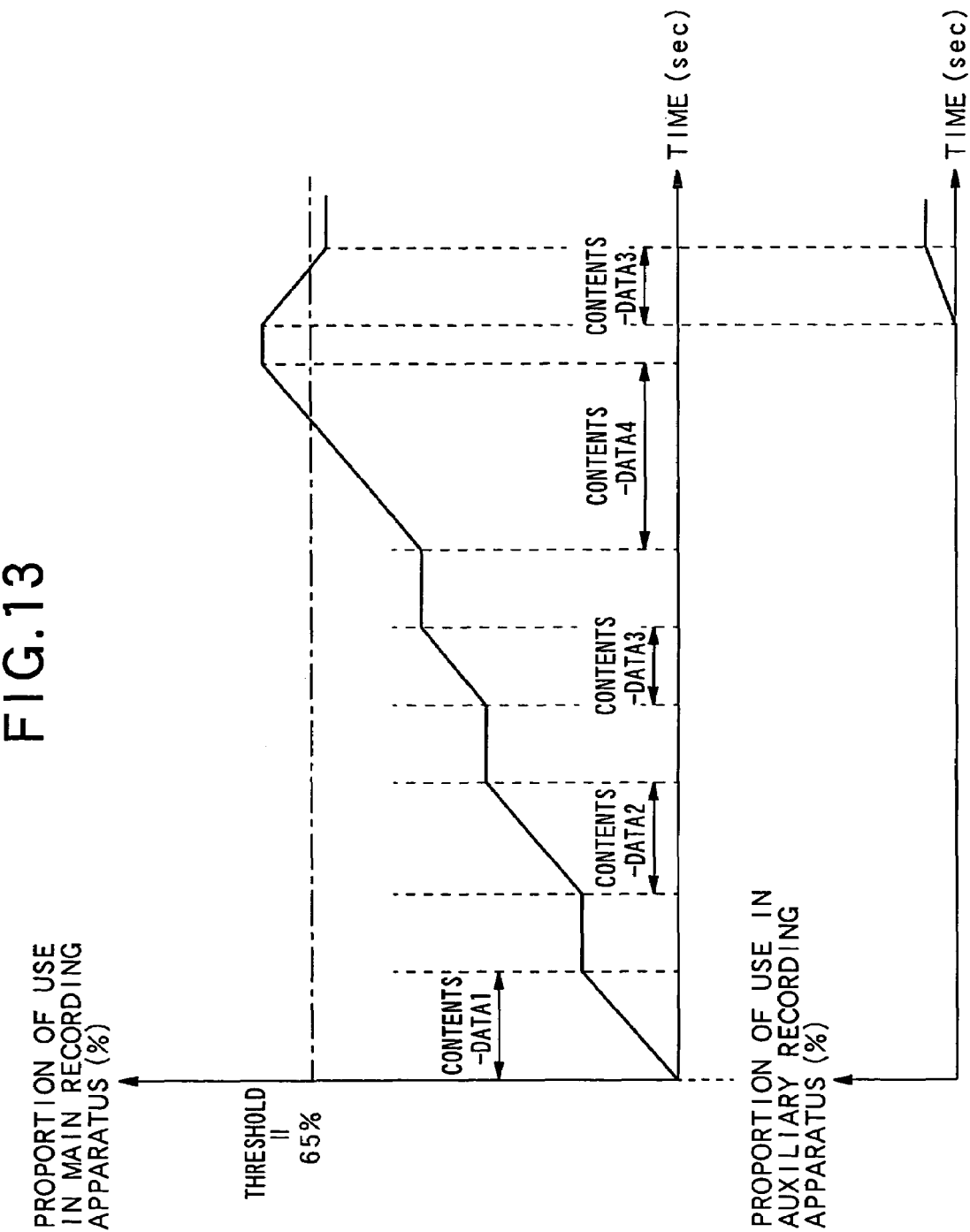
FIG. 13 is a graph showing a change in a storage amount in the main recording apparatus 102 and an auxiliary recording apparatus 103 in the first embodiment.

For example, in the case shown in FIG. 7, when the "contents-data 3" in the contents-data recorded in the main recording apparatus 102 is erased as a result of the above process, the proportion of the used storage area in the total storage capacity of the main recording apparatus 102 changes as shown in FIG. 13. As a result, the proportion of the used storage area in the main recording apparatus 102 becomes below the threshold. On the other hand, the compressed contents-data corresponding to the "contents-data 3" is recorded in the auxiliary recording apparatus 103, and the proportion of the used storage area in the total storage capacity of the auxiliary recording apparatus 103 changes as shown in FIG. 13.

(2) Operation at the Time of Reproducing Contents-data

The operation performed at the time of reproducing contents-data stored in the main recording apparatus 102 and the auxiliary recording apparatus 103 will now be described.

First, in the case of reproducing contents-data and the compressed contents-data in the image processing apparatus 1, the user has to perform an input operation to carry out reproduction by operation of the user I/F unit 105. When the user operates the user I/F unit 105, the reproduction managing unit 1084 reads information of the "category", "contents name", and the like from the contents management table TBL2 in accordance with an input signal sent from the user I/F unit 105, and generates image data corresponding to a list of reproduction candidates. At this time, the reproduction managing unit 1084 removes information whose "erase state" is "complete erase" in the contents management table TBL2 from the reproduction candidates.

Subsequently, the reproduction managing unit 1084 outputs the image data to the image display unit 104. As a result, a reproduction candidate selecting screen as shown in FIG. 14 is displayed on the monitor 2. In the diagram, an item which is currently selected is displayed in reverse video. In this state, the user can perform an input operation of selecting reproduction candidates in the user I/F unit 105. When an input operation is performed by the user, the reproduction managing unit 1084 generates image data in which an item sequentially being selected is displayed in reverse video, and supplies the generated image data to the image display unit 104.

When the user performs an input operation of selecting an item corresponding to "aaa" in the user I/F unit 105, the reproduction managing unit 1084 stops outputting of image data corresponding to the selection screen, and outputs a control signal to the image display unit 104.

In the case where the item selected by the user belongs to the category of the "erased contents-data", the reproduction managing unit 1084 outputs a control signal to which the recording position of the compressed contents-data and the "erase state" are added, to the image display unit 104. The image display unit 104 reads the compressed contents-data from the recording position added to the control signal, and decodes the compressed contents-data in accordance with information indicative of the compression method included in the "erase state".

On the other hand, when the selected item belongs to the category of "un-reproduced contents-data" or "reproduced contents-data", like contents-data corresponding to "aaa", the reproduction managing unit 1084 adds only the recording position of contents-data without adding the "erase state" to the control signal to be sent to the image display unit 104. The image display unit 104 decodes the contents-data in the MPEG form that is set as default, and supplies the decoded contents-data to the monitor 2. The processes are executed and, as a result, an image corresponding to the contents-data is displayed on the monitor 2.

After that, on completion of reproduction of the "contents-data 3", by using the completion of reproduction as a trigger, the table managing unit 1082 reads a "genre" corresponding to the reproduced "contents-data 3" from the contents management table TBL2, and increments the counter of the total reproduction number Xp corresponding to the "genre" in the genre management table TBL1 by "1".

The table managing unit 1082 executes processes similar to those in FIG. 9, thereby calculating the reproduction frequency Sx corresponding to each of the contents-data, and determines reproduction priority corresponding to contents-data. The table managing unit 1082 updates the contents management table TBL2 on the basis of the reproduction priority calculated in such a manner.

Since the process is similar to that in step S14, the details will be omitted.

(3) Process of Updating the Number of Regrets Xm

Figure 15:
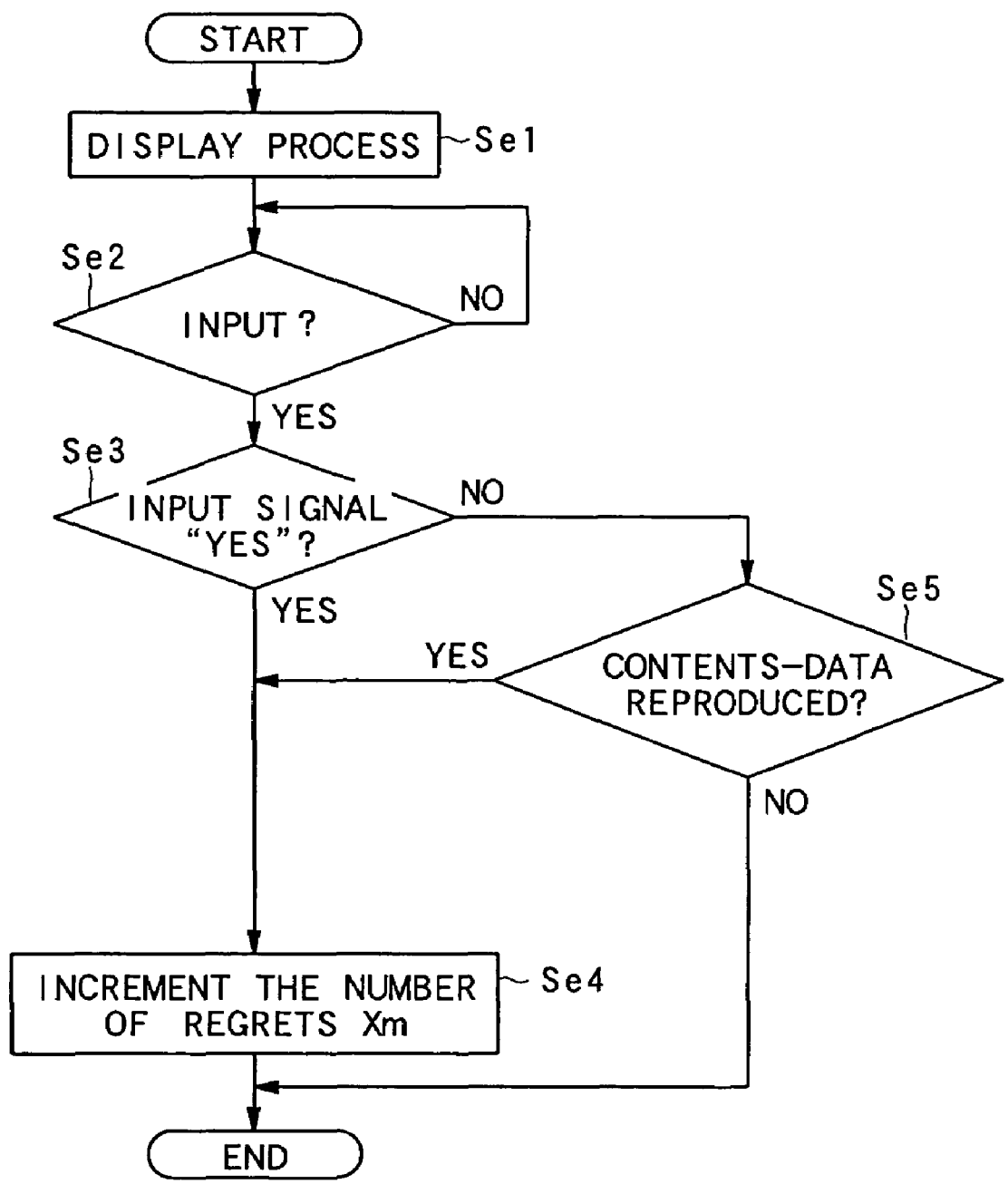
FIG. 15 is a flowchart showing processes executed by the table managing unit 1082 in the system controlling unit 108 in the first embodiment.

A process of updating the number of regrets Xm in the image processing apparatus 1 according to the embodiment will now be described with reference to FIG. 15. The process is performed by the table managing unit 1082 after lapse of a predetermined period since contents-data stored in the main recording apparatus 102 has been compressed/erased. To make the following description more concretely, a case where the "contents-data 3" is compressed and where it is determined whether or not the user regrets setting of the "contents-data 3" as an object to be compressed will be described.

First, in the process, the table managing unit 1082 generates image data corresponding to a confirmation screen to check whether or not the user regrets setting of the "contents-data 3" as an object to be compressed, and outputs the image data to the image display unit 104 (step Se1). Whether the user has entered data or not is determined (step Se2), and the process in the step is repeated until the user enters. As a result, the image corresponding to the confirmation screen is displayed on the monitor 2.

The configuration of the confirmation screen is arbitrary. For example, the title name of the compressed "contents-data 3" and a character train of "Do you regret deleting of data?" may be displayed together with "yes" and "no" buttons.

On the other hand, when the user performs an input operation of selecting "yes" or "no" in the user I/F unit 105 in accordance with the confirmation screen, an input signal corresponding to the input operation is sent from the user I/F unit 105 to the system controlling unit 108, and "yes" is determined in step Se2. The table managing unit 1082 determines whether the input signal is "yes" or not (step Se3).

In the case where the user performs an input operation of selecting "yes" in the user I/F unit 105, the table managing unit 1082 determines "yes" in step Se3, increments the counter of the number of regrets Xm of the genre to which the "contents-data 3" in the genre management table TBL1 belongs by only "1" (step Se4), and finishes the process.

In contrast, when the input signal is "no", the table managing unit 1082 determines "no" in step Se3 and, after compression of the "contents-data 3", determines whether corresponding compressed contents-data has been reproduced or not (step Se5). When "yes" is determined as a result, the table managing unit 1082 increments the counter of the number of regrets Xm of the genre to which the contents-data belongs in the genre management table TBL1 by "1" (step Se4), and finishes the process. On the other hand, when "no" is determined in step Se5, the table managing unit 1082 finishes the process without updating the genre management table TBL1.

When the genre management table TBL1 is updated in such manner, the table managing unit 1082 calculates the reproduction frequency Sx in which parameters after updating are reflected and which is stored in the table TBL1, and determines reproduction priority. The table managing unit 1082 updates the contents management table TBL2 on the basis of the reproduction priority. Since the processes performed by the table managing unit 1082 in this case are similar to those in steps S3 to S5, the detailed description will be omitted here.

As described above, the image processing apparatus 1 according to the embodiment has: the main recording apparatus 102 which records a plurality of pieces of contents-data including at least image data; the image display unit 104 which reads the contents-data, decodes the read contents-data, and outputs an image signal corresponding to the read contents-data; the system controlling unit 108 which calculates the reproduction frequency Sx indicative of reproduction desire of the user for the contents-data on the basis of information such as the number of recording contents Xr indicative of at least one of a recording state or a reproduction state of the contents-data, and which, when the proportion of use of the recording capacity of the main recording apparatus 102 exceeds a threshold, selects at least one piece of the plurality of pieces of contents-data recorded in the main recording apparatus 102 on the basis of the reproduction frequency Sx; and the picture rate converting apparatus 109 which erases the selected contents-data from the main recording apparatus 102.

With the configuration, in the embodiment, an object to be erased is determined in consideration of preference of the user, and contents-data recorded in the main recording apparatus 102 is automatically erased. Thus, the storage capacity of the main recording apparatus 102 can be effectively used.

The image processing apparatus 1 according to the embodiment calculates the reproduction frequency Sx on the basis of the number of regrets Xm indicating whether or not the user regrets having erased the contents-data selected by the system controlling unit 108 from the main recording apparatus 102. Consequently, as compared with the case of determining an object to be compressed/erased on the basis of only the number of reproduction times or recording date and time, determination of an object to be compressed/erased in which preference of the user is more reflected can be realized.

The image processing apparatus 1 according to the embodiment further includes the TV receiving unit 101 which receives the contents-data, so that various kinds of broadcast contents can be recorded in the main recording apparatus 102.

The image processing apparatus 1 according to the embodiment further includes the auxiliary recording apparatus 103 which is provided for assisting the main recording apparatus 102, and records compressed contents-data; and the picture rate converting apparatus 109 which writes contents-data determined as an object to be erased as compressed contents-data into the auxiliary recording apparatus.

With the configuration, contents-data recorded in the main recording apparatus 102 is compressed, and then the compressed contents-data is recorded in the auxiliary recording apparatus 103. Consequently, even in the case where contents-data has been erased from the main recording apparatus 102 by mistake, a compressed image corresponding to the contents-data can be reproduced, and the frequency with which the user regrets can be decreased.

The image processing apparatus 1 according to the embodiment decodes the contents-data, performs a compressing process of encoding the decoded image signal by a step larger than a quantization step in the contents-data, and then records the resultant data into the auxiliary recording apparatus 103.

The image processing apparatus 1 according to the embodiment further performs a compressing process of reducing or thinning out frames such as B frames which exert a little influence on an image at the time of decoding from a plurality of frames constructing the contents-data at a predetermined ratio, and records the resultant data into the auxiliary recording apparatus 103.

The image processing apparatus 1 according to the embodiment decodes the contents-data, performs a compressing process of re-encoding the decoded contents-data by a method different from that of the first image data, and then records the resultant data into the auxiliary recording apparatus 103.

With the configurations, in the image processing apparatus 1 according to the embodiment, at the time of recording contents-data into the auxiliary recording apparatus 103, the contents-data is compressed. Consequently, the storage capacity of the auxiliary recording apparatus 103 can be used more effectively.

Further, the image processing apparatus 1 according to the invention has the configuration in which any one of the plurality of compressing processes is selectively executed on the basis of the recording amount of the auxiliary recording apparatus 103, the data amount of the contents-data, and the like. Thus, contents-data to be compressed can be compressed by a compressing method adapted to the characters of the data.

Although metadata recorded in the metadata recording unit 106 according to the embodiment is illustrated in the format as shown in FIG. 6, the invention is not limited to the format, but metadata may be generated in other formats.

In the embodiment, the picture rate converting apparatus 109 executes any of the compressing methods 1to3. The invention is not limited to such compressing methods, but may employ the other compressing methods.

Although contents-data is encoded in the MPEG form in the embodiment, contents-data may be encoded by other encoding methods in the invention.

In the embodiment, the operation of compressing contents-data stored in the main recording apparatus 102 and recording the compressed contents-data into the auxiliary recording apparatus 103 is executed by the system controlling unit 108. Alternately, a recording medium on which a program specifying the operation of the process is recorded and a computer which reads the program may be provided. By reading the program by the computer, the operation of the recording process may be performed in a manner similar to the above.

1.3 First Modification

Figure 16:
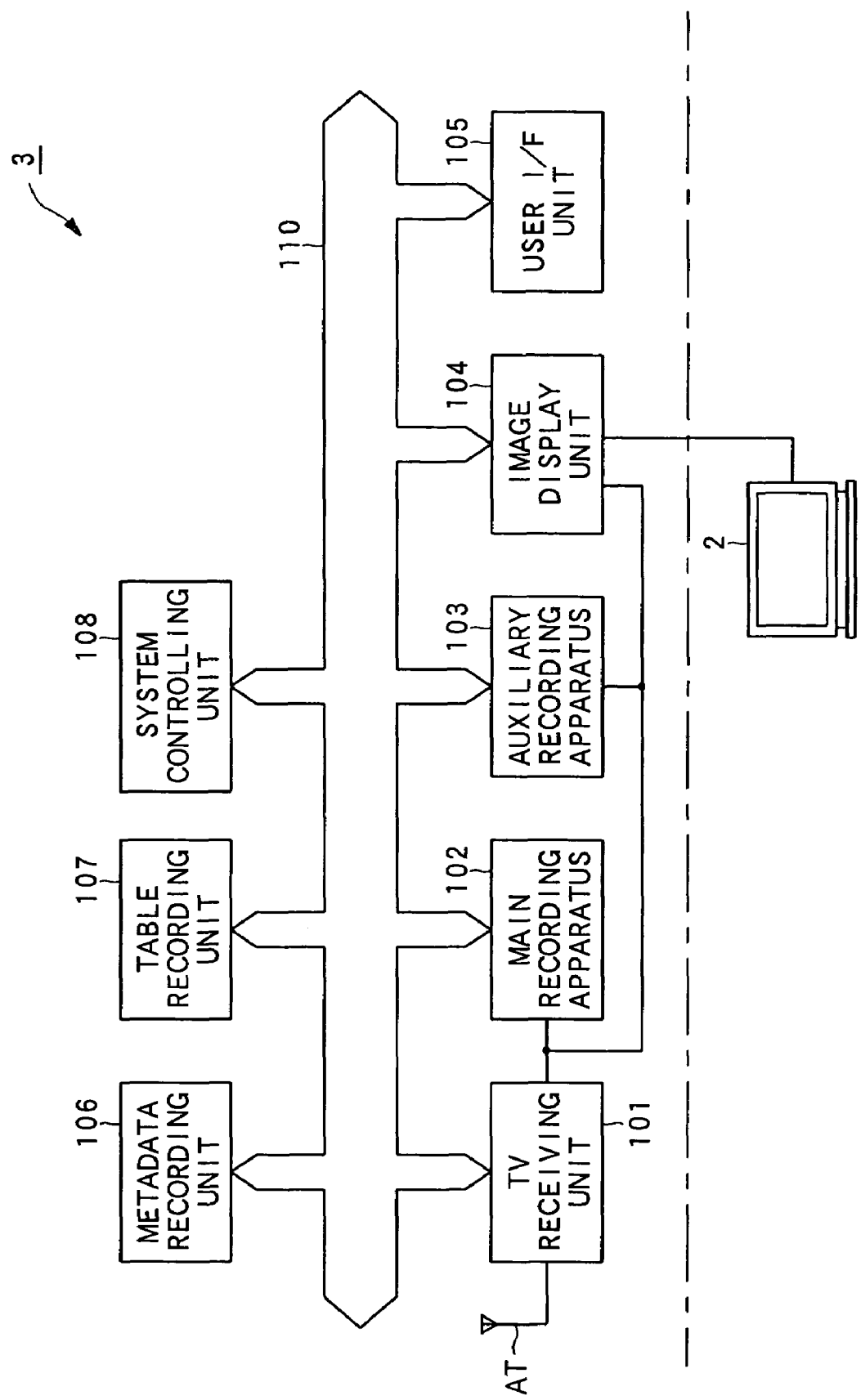
FIG. 16 is a block diagram showing the configuration of an image processing apparatus 3 in a first modification.

An image processing apparatus 3 of a first modification of the first embodiment will now be described by referring to FIG. 16. In FIG. 16, the similar reference numerals are designated to the elements similar to those in FIG. 1.

In the image processing apparatus 3 of the first modification, when contents-data recorded in the main recording apparatus 102 exceeds a threshold, the contents-data is recorded as it is into the auxiliary recording apparatus 103 without compressing the contents-data. To realize the function, different from the image processing apparatus 1 shown in FIG. 1, the image processing apparatus 3 of the modification does not have the picture rate converting apparatus 109 (refer to FIG. 16).

Since such a configuration is employed, the image processing apparatus 3 of the modification stores contents-data read in step Sc1 into the auxiliary recording apparatus 103 in step Sc6 without performing steps Sc2 to Sc5 in FIG. 11.

With the configuration, contents-data recorded in the auxiliary recording apparatus 103 is not compressed, so that the storage capacity of the main recording apparatus 102 can be assured without deteriorating the picture quality at the time of reproduction.

1.4 Second Modification

Figure 17:
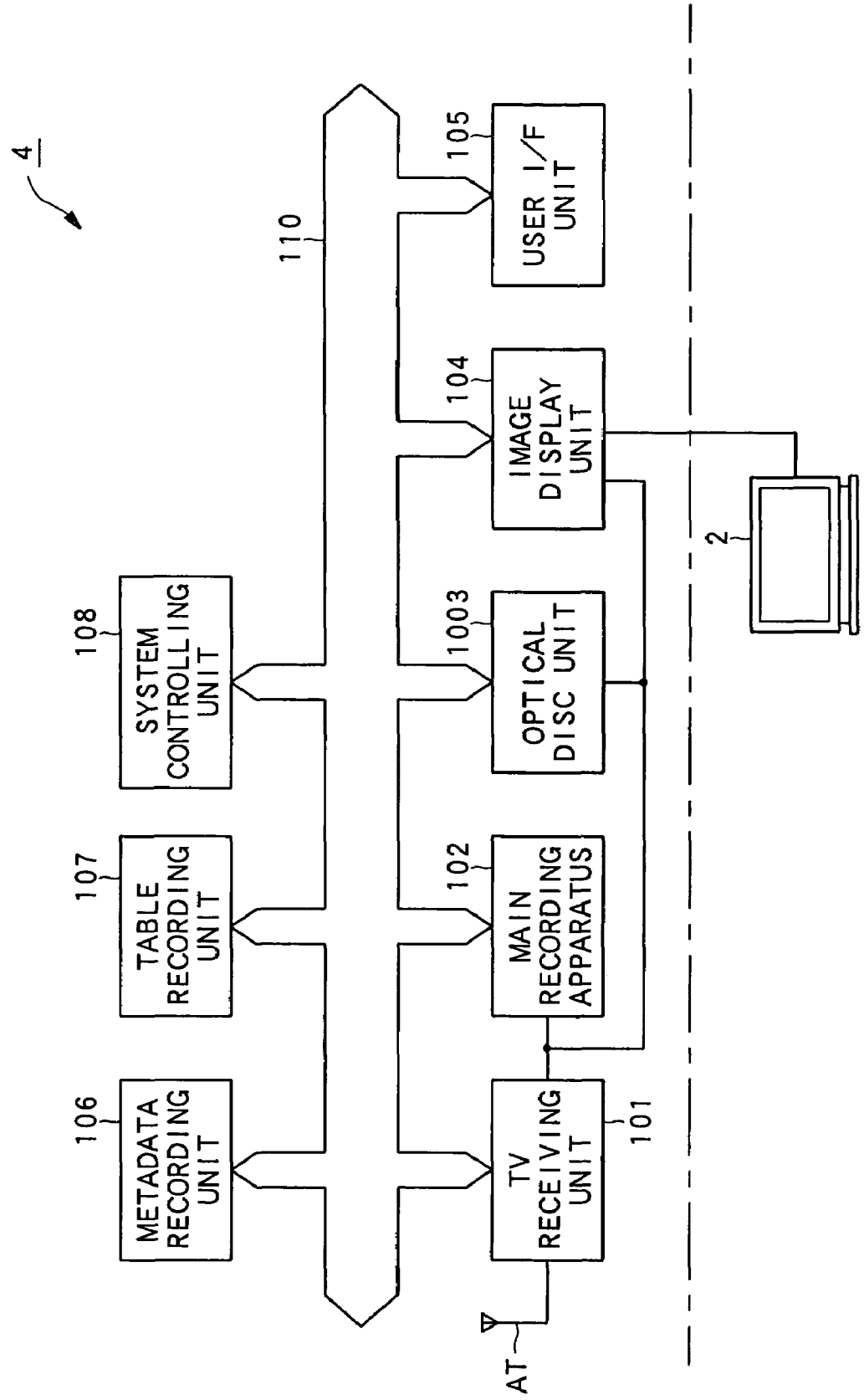
FIG. 17 is a block diagram showing the configuration of an image processing apparatus 4 in a second modification.

An image processing apparatus 4 of a second modification of the first embodiment will now be described by referring to FIG. 17. In FIG. 17, the similar reference numerals are designated to the elements similar to those in FIG. 1. Therefore, in FIG. 17, components having the same reference numerals as those shown in FIG. 1 have the like functions, and perform the like operations unless otherwise specified.

As shown in FIG. 17, different from the image processing apparatus 1 mentioned above, the image processing apparatus 4 does not have the auxiliary recording apparatus 103, but has an optical disc drive 1003 such as a DVD-RW as an auxiliary recording apparatus of the main recording apparatus 102. The image processing apparatus 4 has a configuration in which when the proportion of use of the storage capacity of the main recording apparatus 102 exceeds a predetermined threshold, contents-data having low reproduction priority in contents-data recorded in the main recording apparatus 102 is recorded into an optical disc in the optical disc unit 1003 without being compressed, thereby assuring the storage capacity of the main recording apparatus 102. Consequently, the image processing apparatus 4 does not have the picture rate converting apparatus 109 either.

To realize the function, the system controlling unit 108 in the image processing apparatus 4 of the modification does not perform the processes shown in FIGS. 11 and 12, but the optical disk unit 1003 reads and records contents-data determined in step Sb6 in FIG. 9. The other processes are performed in a manner similar to the image processing apparatus 1.

As described above, the image processing apparatus 4 of the modification has the configuration of using, as the auxiliary recording apparatus, the optical disc which can be easily exchanged, and the drive for reading/writing data from/to the optical disc.

With the configuration, the image processing apparatus 4 of the modification can erase contents-data in the main recording apparatus, and store the erased contents-data without considering the storage capacity of the auxiliary recording apparatus.

2.3 Third Modification

Figure 18:
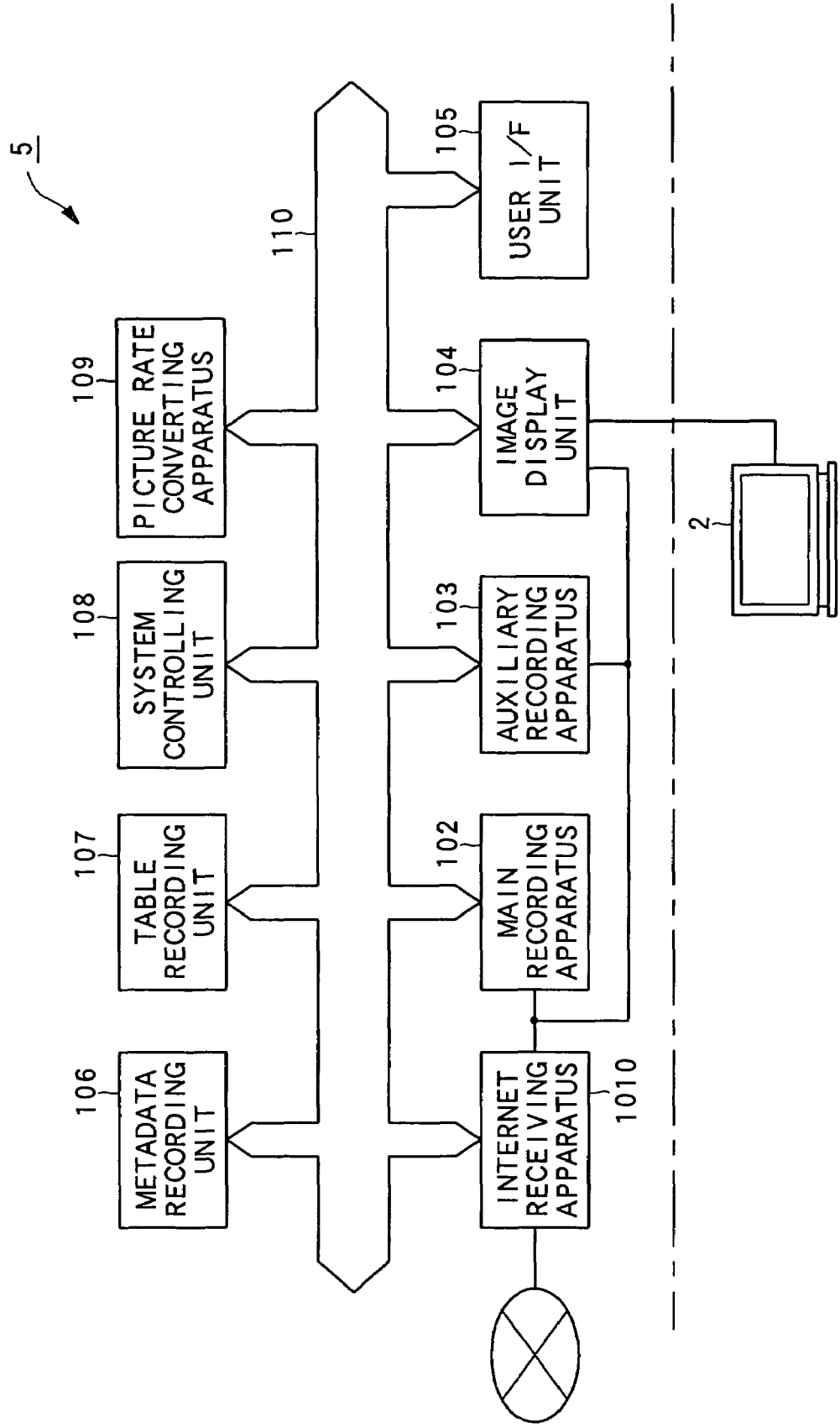
FIG. 18 is a block diagram showing the configuration of an image processing apparatus 5 in a third modification.

An image processing apparatus 5 of a third modification of the first embodiment will now be described by referring to FIG. 18. The similar reference numerals are designated to the elements similar to those in FIG. 1. Therefore, in FIG. 18, components having the same reference numerals as those shown in FIG. 1 have the same functions, and perform the same operations unless otherwise specified.

As shown in FIG. 1, the image processing apparatus 1 of the first embodiment employs the configuration of receiving broadcast waves of terrestrial digital broadcast and recording contents-data included in the broadcast waves into the main recording apparatus 102. Alternately, a configuration of obtaining contents-data via an open network such as Internet or a closed network such as a WAN or LAN may be employed. FIG. 18 is a block diagram showing the configuration of an image processing apparatus 5 in the case of employing the configuration. As shown in FIG. 18, the image processing apparatus 5 has an Internet receiving apparatus 1010 in place of the TV receiving unit, so that it can be sufficient to receive contents-data by using the Internet receiving apparatus 1010.

Figure 19:
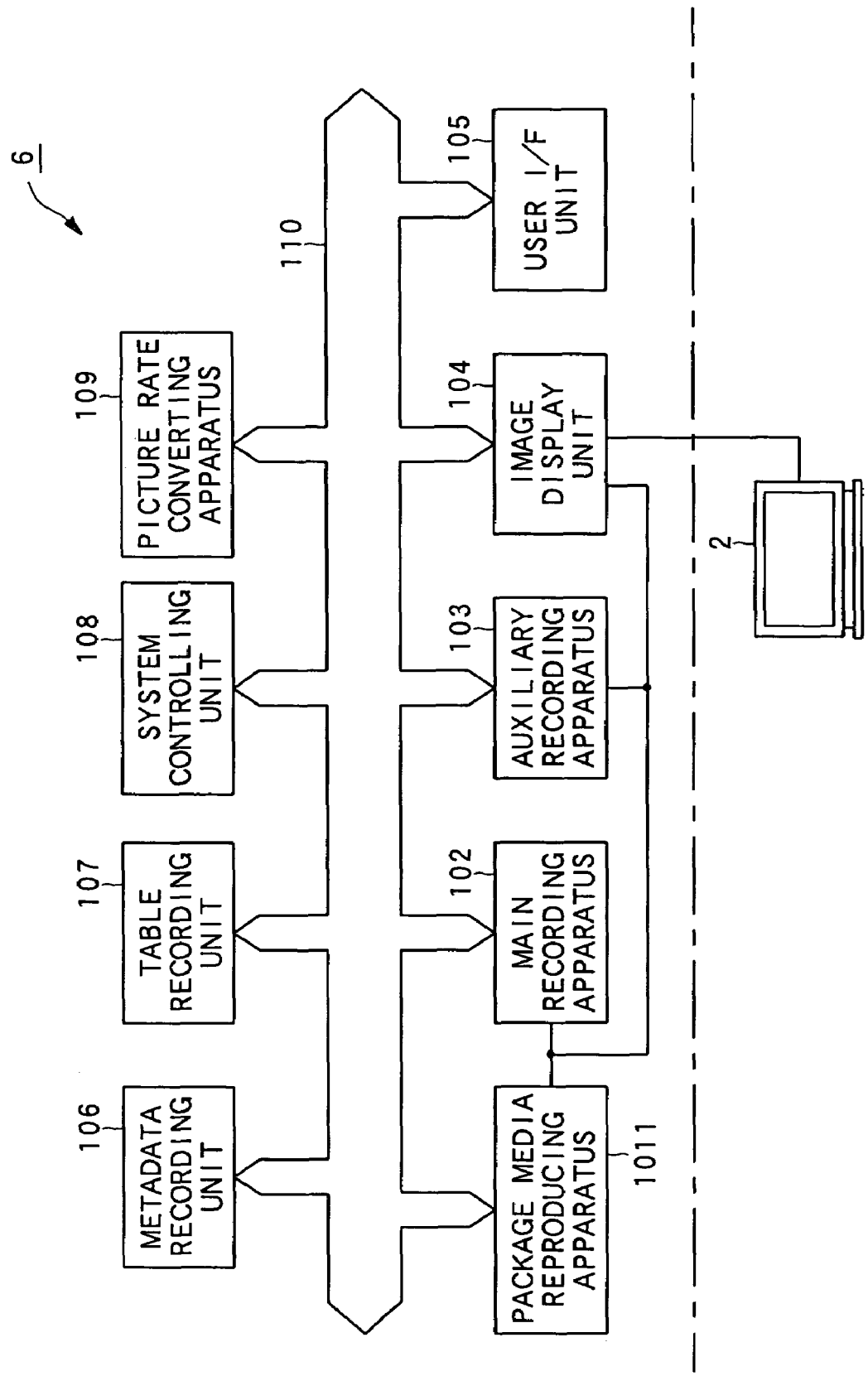
FIG. 19 is a block diagram showing the configuration of an image processing apparatus 6 in the third modification.

Further, contents-data may be obtained from a package medium. FIG. 19 is a block diagram showing the configuration of an image processing apparatus 6 in this case. As shown in FIG. 19, it is necessary that a package media reproducing apparatus 1011 is provided in place of the TV receiving unit, and contents-data is read by using the package media reproducing apparatus 1011.

As described above, the image processing apparatuses 5 and 6 of the modification have the Internet receiving apparatus 1010 for receiving contents-data which is received/transmitted in the transmission media such as Internet, and the package media reproducing apparatus 1011 which reads contents-data recorded in a package medium. Thus, also in the case of recording/reproducing contents-data other than the broadcast contents, an object to be compressed can be determined while making preference of the user reflected.

1.5 Fourth Modification

Figure 20:
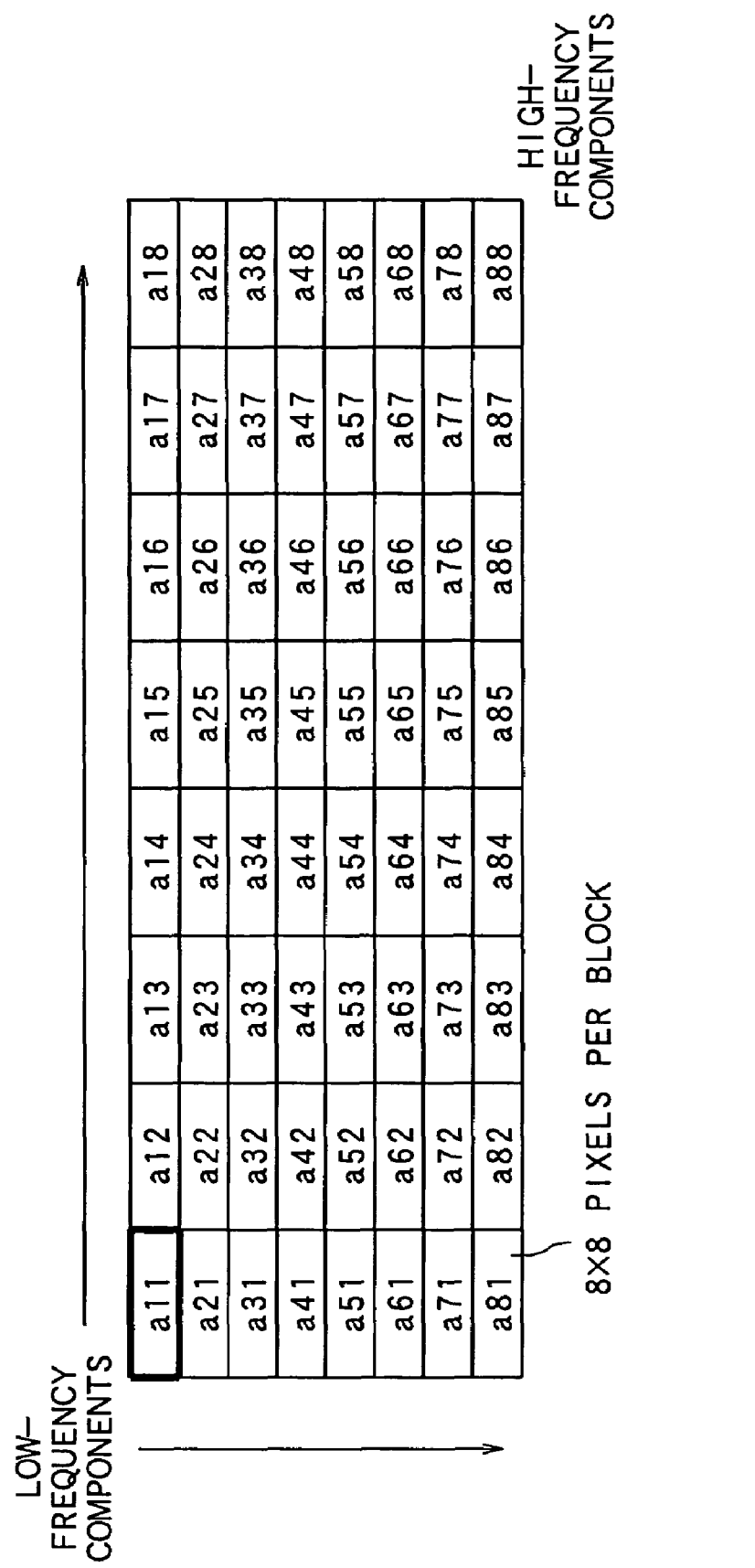
FIG. 20 is a diagram for explaining process of the compressed data in a picture rate apparatus 100 in a fourth modification.

The image processing apparatus 1 of a fourth modification of the first embodiment will now be described with reference to FIG. 20. FIG. 20 is a diagram illustrating process of compressed data in the picture rate converting apparatus 109 in the modification.

The picture rate converting apparatus 109 of the first embodiment employs the configuration of decoding contents-data recorded in the main recording apparatus 102, and compressing the decoded contents-data by a quantizing step larger than that used for the recorded contents-data. In place of the data compressing method, data compression may be realized by using only data of low frequency components in a spatial frequency area as compressed data.

Concretely, in the modification, the picture rate converting apparatus 109 performs orthogonal transformation in blocks each constructed by, for example, 8 pixels×8 pixels frame by frame to transform image data in each frame to a spatial frequency area. The picture rate converting apparatus 100 generates compressed data by using, as compressed data, only low frequency components of each frame transformed to the spatial frequency area, for example, only data of block a11 or a block composed of a11, a12, and a21 shown in FIG. 20, that is, by quantization, and records the compressed data into the auxiliary recording apparatus 103.

Each of a11 to a88 in FIG. 20 denotes a block constructed by 8 pixels×8 pixels in each frame. FIG. 20 shows that the spatial frequency increases from a11 to a81 and from a11 to a18.

1.6 Fifth Modification

The image processing apparatus 1 of a fifth modification of the first embodiment will now be described.

In the image processing apparatus 1 according to the first embodiment, at the time of erasing compressed contents-data from the auxiliary recording apparatus 103 in management of compression and erasure of data recorded in the main recording apparatus 102 and the auxiliary recording apparatus 103, the compressed contents-data is selectively erased from the data having the oldest recording date and time. Alternately, in place of selecting compressed contents-data to be erased according to recording date and time, compressed contents-data to be erased may be selected on the basis of the genre of contents-data. In this case, the data erase managing unit 1083 preliminarily sets priority to erase contents-data on the basis of the genre such as the reproduction frequency Sj in the first embodiment, and erases the contents-data from the contents-data belonging to the genre of the low priority.

1.7 Sixth Modification

The image processing apparatus 1 of a sixth modification of the first embodiment will now be described.

The image processing apparatus 1 of the first embodiment selects one of a plurality of contents-data compressing methods on the basis of motion of a motion picture in contents-data, that is, the characteristics of contents-data to be compressed such as a spatial frequency in the contents-data compressing process. Alternately, the compressing method may be selected on the basis of the genre of the contents-data to be compressed. For example, in the case of a "variety show" indicative of the genre of popular entertainment or such a kind, compressed contents-data is generated by the first compressing method of the first embodiment, specifically, the compression method of encoding contents-data by a quantizing step larger than the recording rate of the contents-data recorded in the main recording apparatus 102. In the case of the genre having a story such as a movie or drama, summarized reproduction data in a second embodiment that will be described later is generated.

2. Second Embodiment

An image processing apparatus according to a second embodiment will be described.

The second embodiment is characterized by the point of reproducing contents-data in shortened reproduction time in place of the point of selecting the compressing method in the contents-data compressing process in the process of determining an object to be erased/compressed in the first embodiment. Since the other configuration is similar to that of the first embodiment, the same reference numerals are designated to members which are the same as those in the first embodiment, and their description will be omitted.

Concretely, the picture rate converting apparatus 109 of the second embodiment extracts frames belonging to a characteristic reproduction interval in decoded contents-data at the time of reproducing contents-data, at the time of decoding contents-data which is recorded in the main recording apparatus 102, to thereby generate contents-data for which the same amount of the data as the compressed contents-data in the first embodiment is reduced (hereinbelow, called summarized reproduction data generating process). The picture rate converting apparatus 109 of the second embodiment records generated contents-data into the auxiliary recording apparatus 103 in a manner similar to the first embodiment.

For example, the picture rate converting apparatus 109 detects a scene change point on the basis of video data included in contents-data, and extracts a reproduction interval from the extracted scene change point to a point after lapse of predetermined time, or extracts a reproduction interval in which the sound volume level exceeds a predetermined volume level on the basis of sound data included in the contents-data. The picture rate converting apparatus 109 connects the reproduction intervals in order of reproduction time, or further extracts a predetermined time from the reproduction interval and connects the time in order of reproduction time, thereby generating contents-data for which the same amount of data as the compressed contents-data in the first embodiment is reduced, and records the generated contents-data into the auxiliary recording apparatus 103.

In the case where the picture rate converting apparatus 109 generates contents-data whose amount is reduced by extracting frames belonging to the characteristic reproduction intervals at the time of reproducing contents-data, in the contents-data compressing process, the data erase managing unit 1083 performs the summarized reproduction data generating process in place of the contents-data compressing process shown in step Sb7 in FIG. 10 in the first embodiment, or in place of one compressing method selected as a compressing method in FIG. 11.

As described above, also in the second embodiment, the contents-data recorded in the main recording apparatus 102 is recorded in the auxiliary recording apparatus 103, and remains therein. Therefore, even in the case where contents-data is erased from the main recording apparatus 102 by mistake, in a manner similar to the first embodiment, a picture corresponding to the contents-data can be reproduced, and the user regret ratio can be reduced.

In the modification, the reproduction interval is extracted on the basis of the scene change point in video data or the sound level of sound data. However, the invention is not limited to the case, as long as a characteristic reproduction interval at the time of reproducing contents-data can be extracted. Also in the second embodiment, in the same manner as the first embodiment, the image processing apparatus may have the configurations of the modifications.

3. Third Embodiment

Figure 21:
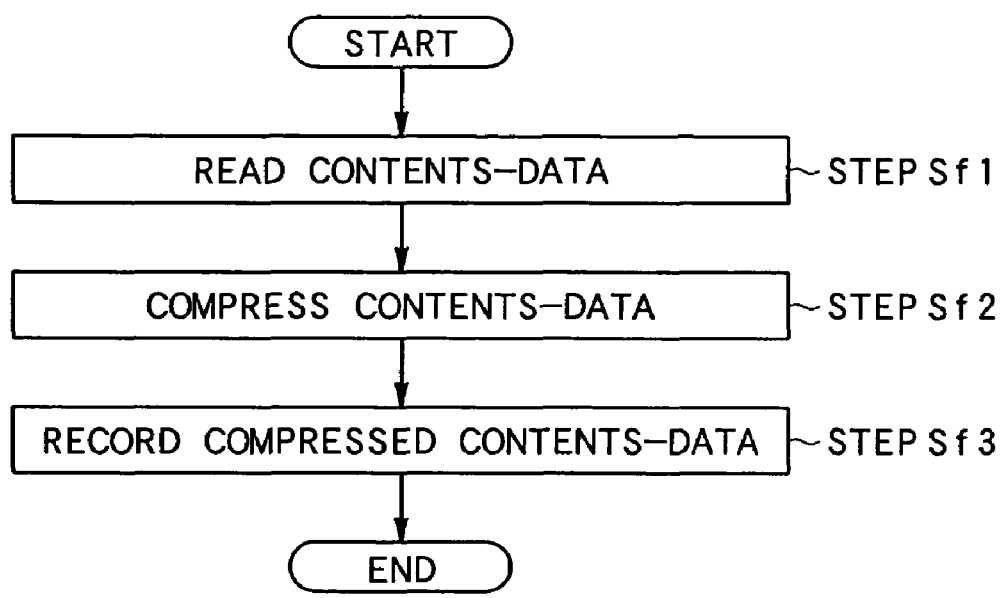
FIG. 21 is a flowchart showing process executed by the data erase managing unit 1083 in the system controlling unit 108 in a third embodiment.

The image processing apparatus 1 according to a third embodiment will be described with reference to FIG. 21.

The third embodiment is characterized by the point that a compressing method is preliminarily determined in place of the point of selecting the compressing method in the contents-data compressing process in the process of determining an object to be erased or compressed in the first embodiment. Since the other configuration is similar to that of the first embodiment, the same reference numerals are given to members which are the same as those of the first embodiment, and their description will be omitted.

The image processing apparatus 1 of this embodiment has the data erase managing unit 1083 in which the compressing method is set by the user via the user interface unit 105 before the process of determining an object to be erased/compressed is performed. The data erase managing unit 1083 of the third embodiment performs a compressing process or data reduction by the set compressing process or other data amount reducing process at the time of performing the process of determining an object to be erased/compressed.

The picture rate converting apparatus 109 of this embodiment compresses contents-data by using the compressing method which is set by the user under control of the data erase managing unit 1083. The details of the operation of the data erase managing unit will be described below.

3.1 Operation of Third Embodiment

First, the contents-data compressing process in the data erase managing unit of the third embodiment will be described in detail with reference to FIG. 21.

Since the operation at the time of recording contents-data of the third embodiment and other processes of the process of determining an object to be erased/compressed in the operation are similar to those of the first embodiment, the same reference numerals are designated to processes which are the same as those of the first embodiment, and their description will be omitted. FIG. 21 is a flowchart showing the contents of a contents-data compressing process executed by the data erase managing unit 1083 in step Sb7 in FIG. 10 in the first embodiment.

In the process, first, the data erase managing unit 1083 outputs a control signal to the picture rate converting apparatus 109, thereby making the picture rate converting apparatus 109 read contents-data to be compressed (step Sf1).

Subsequently, the data erase managing unit 1083 compresses the read contents-data by the preset compressing process (step Sf2). For example, in the embodiment, the data erase managing unit 1083 uses a compressing method in a manner similar to the first embodiment.

i) Compressing Method 1.

The picture rate converting apparatus 109 once decodes contents-data read from the main recording apparatus 102, and encodes the contents-data again by a larger quantizing step, thereby generating compressed contents-data.

ii) Compressing Method 2

The picture rate converting apparatus 109 generates the second contents-data by decoding contents-data read from the main recording apparatus 102 and performing a frame reducing compressing process of reducing predetermined frames from a plurality of frames constructing the decoded contents-data.

iii) Compressing Method 3

The picture rate converting apparatus 109 decodes contents-data read from the main recording apparatus 102, and re-encodes the contents-data by a method of a higher compression rate such as the H.264 (ITU-T) or WMV9 (Windows Media® 9) method than that of the decoded contents-data, thereby generating compressed contents-data.

After completion of the data compression, the data erase managing unit 1083 executes a process of recording the compressed contents-data (step Sf3), and finishes the process.

As described above, the image processing apparatus 1 according to the embodiment further includes: the auxiliary recording apparatus 103 which is provided to assist the main recording apparatus 102 and records compressed contents-data; and the picture rate converting apparatus 109 which writes, as compressed contents-data, contents-data determined as an object to be erased into the auxiliary recording apparatus 103.

With the configuration, after contents-data recorded in the main recording apparatus 102 is compressed, the contents-data is recorded in the auxiliary recording apparatus 103 and remains therein. Consequently, in a manner similar to the first embodiment, even in the case where contents-data is erased from the main recording apparatus 102 by mistake, a compressed image corresponding to the contents-data can be reproduced. Thus, the user regret ratio can be reduced.

Also in the third embodiment, in a manner similar to the first embodiment, the image processing apparatus may have any of the configurations of the modifications and the other embodiments, and the image compressing process of the modifications may be also performed. In the third embodiment, in a manner similar to the second embodiment, the summarized reproduction data generating process may be executed in place of the data compressing process.

4. Fourth Embodiment

The image processing apparatus 1 according to a fourth embodiment will be described with reference to FIG. 22.

The fourth embodiment is characterized by the point that the compression ratio of compressed contents-data is lowered in place of the point of deleting compressed contents-data recorded in the auxiliary recording apparatus in the first embodiment. Since the other configuration is similar to that of the first embodiment, the same reference numerals are given to members which are the same as those of the first embodiment, and their description will be omitted.

Concretely, the image processing apparatus 1 of the fourth embodiment has the data erase managing unit 1083 for managing compression/erasure of data recorded in the main recording apparatus 102 and the auxiliary recording apparatus 103. The data erase managing unit 1083 of the fourth embodiment determines an object to be erased/compressed in a manner similar to the first embodiment, but performs a process of erasing compressed contents-data in the auxiliary recording apparatus 103, which is different from that of the first embodiment. FIG. 22 is a flowchart showing the contents of recording process in the fourth embodiment.

First, the configuration of the image processing apparatus according to the fourth embodiment will be described.

The data erase managing unit 1083 of the fourth embodiment executes a process of determining an object to be erased/compressed (the process 1 in the first embodiment) in a manner similar to the first embodiment. Specifically, the data erase managing unit 1083 determines whether the use proportion to the whole storage capacity of the main recording apparatus 102 exceeds a predetermined threshold or not.

When it is determined that the use proportion exceeds the threshold, the data erase managing unit 1083 selects contents-data which is determined unnecessary on the basis of the preference of the user from all of the contents-data recorded in the main recording apparatus 102. The data erase managing unit 1083 outputs a control signal including a data sequence indicative of the object to be compressed to the picture rate converting apparatus 109 and, after the selected contents-data is compressed and recorded in the auxiliary recording apparatus 103, erases the contents-data from the main recording apparatus 102.

When the control signal is received, the picture rate converting apparatus 109 reads contents-data corresponding to the object to be compressed from the main recording apparatus 102, compresses the read contents-data, and records the contents-data into the auxiliary recording apparatus 103.

On the other hand, the data erase managing unit 1083 of the fourth embodiment manages date and time of the compressed contents-data recorded in the auxiliary recording apparatus 103 to achieve the lower compression ratio of the compressed contents-data which is already recorded, separately from the time of executing the process of determining an object to be erased/compressed.

Specifically, the data erase managing unit 1083 of the fourth embodiment controls the picture rate converting apparatus 109 after lapse of a predetermined period since the compressed contents-data is recorded in the auxiliary recording apparatus 103 to convert the compressed contents-data to contents-data of a lower compression ratio, and re-records or overwrites the resultant contents-data into the auxiliary recording apparatus 103.

For example, the data erase managing unit 1083 of the fourth embodiment makes the picture rate converting apparatus 109 convert compressed contents-data into re-compressed contents-data of a compression ratio lower than that of the compressed contents-data by, for example, generation of re-compressed contents-data by encoding compressed contents-data by a quantizing step larger than that of the compressed contents-data, generation of re-compressed contents-data by thinning out predetermined frames from the frames constructing the compressed contents-data, or the like. The data erase managing unit 1083 then re-records the re-compressed contents-data into the auxiliary recording apparatus 103.

The data erase managing unit 1083 of the fourth embodiment performs the date and time management also on the re-compressed contents-data or further re-compressed contents-data. After lapse of a predetermined period for each compressed contents-data, the data erase managing unit 1083 controls the picture rate converting apparatus 109 to convert the compressed contents-data into contents-data of a lower compression ratio, and re-records the resultant contents-data to the auxiliary recording apparatus 103.

It is assumed that the number of re-recording times of compressed contents-data is predetermined by the user or the like. Since the re-compressed contents-data is naturally overwritten in the auxiliary recording apparatus 103, after re-recording, the compressed contents-data as original data of the re-compressed contents-data is erased from the auxiliary recording apparatus 103.

In the case where the amount of contents-data to be recorded in the auxiliary recording apparatus 103 exceeds the free space of the auxiliary recording apparatus 103, the data erase managing unit 1083 of the fourth embodiment sequentially erases contents-data from contents-data having the lowest compression ratio on the basis of a period since the contents-data is recorded in the auxiliary recording apparatus 103.

Concretely, in the case where the amount of contents-data to be recorded in the auxiliary recording apparatus 103 exceeds the free space of the auxiliary recording apparatus 103, the data erase managing unit 1083 of the fourth embodiment retrieves contents-data which has been compressed by the largest number of times, specifically, contents-data whose compression ratio has been lowered by the number of times larger than that of the other contents-data from the contents-data recorded in the auxiliary recording apparatus 103, and sequentially erases the detected compressed contents-data. In the case where a plurality of pieces of contents-data of large number of compression times are recorded, the data erase managing unit 1083 erases contents-data of the number of days equal to or larger than the number of days which is predetermined for each compression ratio.

In the embodiment, obviously, the data erase managing unit 1083 may erase contents-data in order from the highest compression ratio. In this case, however, as described in the first embodiment, the compressing methods employed first at the time of recording contents-data into the auxiliary recording apparatus 103 may vary among the contents-data, so that contents-data whose compression ratio is higher than the other contents-data may have been compressed by the number larger than that of the other contents-data. Therefore, it is desirable to adjust the contents-data to be selected, on the basis of the compressing method used at the time of recording the contents-data into the auxiliary recording apparatus 103 for the first time.

The compressed contents-data recording process in the fourth embodiment will now be described with reference to FIG. 22. The compressed contents-data recording process performed in step Sc6 in FIG. 11 in the first embodiment will be described with reference to FIG. 22. FIG. 22 is a flowchart showing the contents of the recording process.

Figure 22:
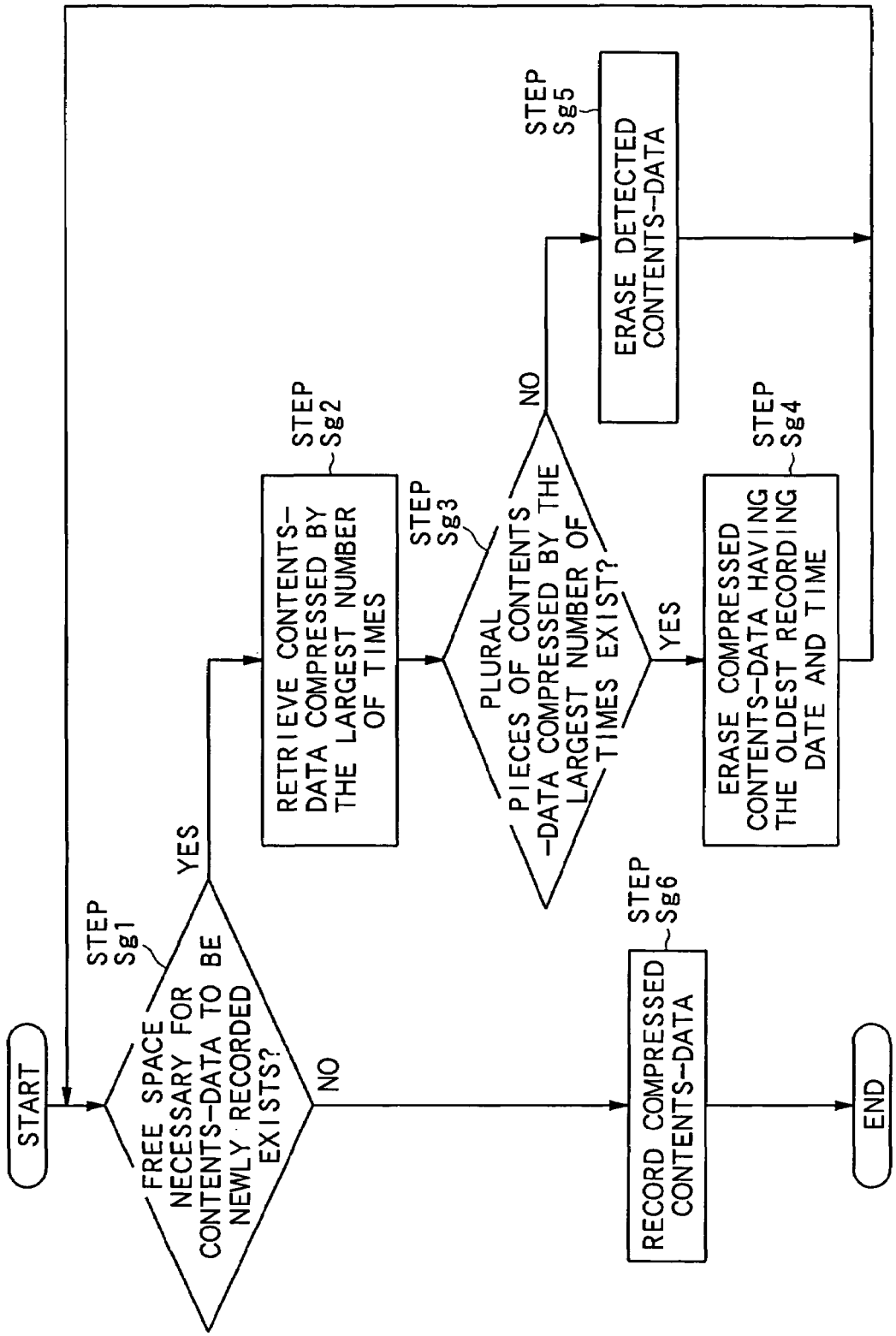
FIG. 22 is a flowchart showing process executed by the data erase managing unit 1083 in the system controlling unit 108 in a forth embodiment.

As shown in FIG. 22, first, the data erase managing unit 1083 of the embodiment determines whether or not the free space of the auxiliary recording apparatus 103 exceeds the storage capacity necessary for recording compressed contents-data to be newly recorded (step Sg1 in FIG. 22). When it is determined that the free space necessary for recording the compressed contents-data does not exist in the auxiliary recording apparatus 103 ("no" in step Sg1 in FIG. 22), the data erase managing unit 1083 retrieves contents-data which has been compressed by the large number of times from the contents-data recorded in the auxiliary recording apparatus 103 (step Sg2 in FIG. 22).

For example, in the case where compressed contents-data and re-compressed contents-data is recorded, the data erase managing unit 1083 detects the re-compressed contents-data. Further, in the case where further re-compressed contents-data is recorded, the data erase managing unit 1083 detects the further re-compressed contents-data.

Subsequently, the data erase managing unit 1083 retrieves the contents-data which has been compressed by the largest number of times, and determines whether a plurality of pieces of contents-data of the largest number of compression times exist or not (step Sg3 in FIG. 22). In the case where it is determined that a plurality of pieces of contents-data exist ("yes" in step Sg3 in FIG. 22), the data erase managing unit 1083 erases compressed contents-data having the oldest date and time recorded in the auxiliary recording apparatus 103 in the contents-data having the compression ratio mentioned above from the auxiliary recording apparatus 103 (step Sg4 in FIG. 22).

On the other hand, when it is determined that there is only one piece of contents-data of the largest number of compression times ("no" in step Sg3 in FIG. 22), the data erase managing unit 1083 erases the contents-data having the compression ratio mentioned above from the auxiliary recording apparatus 103 (step Sg5 in FIG. 22).

The data erase managing unit 1083 repeats the processes in steps Sg1 to Sg5 until the free space of the auxiliary recording apparatus 103 becomes equal to the capacity necessary for recording the compressed contents-data.

After the processes are repeated and, as a result, the free space for recording the compressed contents-data is assured in the auxiliary recording apparatus 103, the data erase managing unit 1083 determines "yes" in step Sd1, outputs a control signal to the picture rate converting apparatus 109 (step Sg6 in FIG. 22), and finishes the contents-data compressing process. As a result, the picture rate converting apparatus 109 records the compressed contents-data into the auxiliary recording apparatus 103, and erases the contents-data corresponding to the compressed contents-data from the main recording apparatus 102.

As described above, in the image processing apparatus 1 according to the embodiment, in the case where the contents-data selected by the system controlling unit 108 is written as compressed contents-data or re-compressed contents-data into the auxiliary recording apparatus 103, when a predetermined condition is satisfied, that is, after lapse of a predetermined period of recording for the recorded contents-data, the picture rate converting apparatus 109 decreases the compression ratio of the compressed contents-data, and re-records the resultant contents-data into the auxiliary recording apparatus 103.

With the configuration, after contents-data recorded in the main recording apparatus 102 is compressed, the contents-data is recorded and remains in the auxiliary recording apparatus 103. On the other hand, the contents-data satisfying the predetermined condition is gradually converted to a low ratio. Consequently, in a manner similar to the first embodiment, even in the case where the contents-data is erased by mistake from the main recording apparatus 102, a compressed picture corresponding to the contents-data can be reproduced, the amount of contents-data to be recorded as a compressed picture can be increased, and the storage capacity in the apparatus for auxiliary recording contents-data can be assured.

Also in the embodiment, as similar to the first embodiment, the image processing apparatus may have the configuration of any of the modifications or other embodiments, and may perform any of the image compressing processes of the modifications or other embodiments. Further, also in the embodiment, as similar to the second embodiment, the summarized reproduction data generating process may be executed in place of the data compressing process.

It should be understood that various alternatives to the embodiments of the invention described herein may be employed in practicing the invention. Thus, it is intended that the following claims define the scope of the invention and that methods and structures within the scope of these claims and their equivalents be covered thereby.

The entire disclosures of Japanese Patent Application No. 2003-359909 filed on Oct. 20, 2003 including the specification, claims, drawings and abstract, and Japanese Patent Application No. 2004-267124 filed on Sep. 14, 2004 including the specification, claims, drawings and abstract are incorporated herein by reference in its entirety.

What is claimed is:

1. An image processing apparatus comprising:
   a recording device which records a plurality of pieces of contents-data including at least image data;
   a decoding device which reads said contents-data, decodes the read contents-data, and outputs an image signal corresponding to the read contents-data;
   a calculating device which calculates reproduction preference information as a reproduction frequency indicative of reproduction desire of a user for said contents-data on the basis of state information, including an un-reproduced state, a reproduced state, and an erased state indicative of at least one of a recording state or a reproduction state of said plurality of pieces of contents-data;
   a selecting device which, when a recording amount of said recording device exceeds a predetermined value, selects at least one piece of said plurality of pieces of contents-data recorded in said recording device, to be erased, on the basis of said reproduction preference information; and
   an erasing device which erases said contents-data selected by said selecting device from said recording device.

2. The image processing apparatus according to claim 1, wherein said calculating device calculates said reproduction preference information on the basis of said state information including at least regret information indicating whether or not the user regrets having erased the contents-data selected by said selecting device from said recording device.

3. The image processing apparatus according to claim 1, further comprising a communicating device which receives said contents-data,
   wherein data received by said communication device is recorded as said contents-data by said recording device.

4. The image processing apparatus according to claim 1, further comprising a reading device which reads said contents-data recorded in an external recording apparatus,
   wherein said recording device records the data read by said recording device as said contents-data.

5. The image processing apparatus according to claim 1, further comprising:
   an auxiliary recording device which is provided for assisting said recording device and in which the second contents-data different from said contents-data is recorded; and
   a writing device which writes contents-data selected by said selecting device as said second contents-data into said auxiliary recording device.

6. The image processing apparatus according to claim 5, wherein said writing device comprises:
   a re-decoding device which decodes contents-data selected by said selecting device into an image signal;
   a generating device which generates said second contents-data having said decoded image signal for which a recording amount is less than that of the contents-data recorded in said recording device; and
   a data writing device which writes said generated second contents-data into said auxiliary recording device.

7. The image processing apparatus according to claim 6, wherein said generating device generates said second contents-data by encoding said decoded image signal by a step larger than a quantizing step used for said contents-data.

8. The image processing apparatus according to claim 6, wherein said generating device generates said second contents-data by performing a frame reducing compressing process of reducing predetermined frames from a plurality of frames constructing said contents-data.

9. The image processing apparatus according to claim 8, wherein said generating device generates said second contents-data by performing said frame reducing compressing process by reducing frames for which influence on a picture is small at the time of decoding from a plurality of frames constructing said contents-data.

10. The image processing apparatus according to claim 5, wherein said writing device decodes said contents-data, converts the contents-data into said second contents-data by performing a re-encoding compressing process of re-encoding the decoded contents-data by a method different from the method of encoding the contents-data, and writes the converted second contents-data into said auxiliary recording device.

11. The image processing apparatus according to claim 5, wherein said auxiliary recording device comprises:
   an exchangeable recording medium; and
   a drive which reads/writes data from/to said recording medium.

12. The image processing apparatus according to claim 1, wherein in the case where contents-data selected by said selecting device is written as said second contents-data in said auxiliary recording device,
   when a predetermined condition is satisfied, said writing device decreases a ratio of said second contents-data already written, and re-records the resultant contents-data into said auxiliary recording device.

13. An image data managing method comprising:
   a calculating process which calculates reproduction preference information as a reproduction frequency indicative of reproduction desire of a user for said contents-data on the basis of state information, including an un-reproduced state, a reproduced state, and an erased state, indicative of at least one of a recording state or a reproduction state corresponding to a plurality of pieces of contents-data including at least image data recorded in a recording device;
   a selecting process which, when a recording amount of said recording device exceeds a predetermined value, selects at least one piece of said plurality of pieces of contents-data recorded in said recording device, to be erased, on the basis of said reproduction preference information; and
   an erasing process which erases said contents-data selected in said selecting process from said recording device.

14. A computer-readable information recording medium on which an image data managing program is recorded,
   wherein said image data managing program manages image data by a computer, and makes said computer function as:
   a calculating device which calculates reproduction preference information as a reproduction frequency indicative of reproduction desire of a user for said contents-data on the basis of state information, including an un-reproduced state, a reproduced state, and an erased state indicative of at least one of a recording state or a reproduction state corresponding to a plurality of pieces of contents-data including at least image data recorded in a recording device;
   a selecting device which, when a recording amount of said recording device exceeds a predetermined value, selects at least one piece of said plurality of pieces of contents-data recorded in said recording device, to be erased, on the basis of said reproduction preference information; and
   an erasing device which erases said contents-data selected by said selecting device from said recording device.

* * * * *